US012620738B2

(12) United States Patent
Brungard et al.

(10) Patent No.: US 12,620,738 B2
(45) Date of Patent: May 5, 2026

(54) LOW-PROFILE ELECTRICAL CONNECTOR

(71) Applicant: FCI USA LLC, Etters, PA (US)

(72) Inventors: Thomas A. Brungard, Lewisberry, PA (US); Steven E. Pressel, Harrisburg, PA (US)

(73) Assignee: FCI USA LLC, Etters, PA (US)

( * ) Notice: Subject to any disclaimer, the term of this patent is extended or adjusted under 35 U.S.C. 154(b) by 493 days.

(21) Appl. No.: 17/973,821

(22) Filed: Oct. 26, 2022

(65) Prior Publication Data

US 2023/0136832 A1 May 4, 2023

Related U.S. Application Data

(60) Provisional application No. 63/273,323, filed on Oct. 29, 2021.

(51) Int. Cl.
*H01R 12/72* (2011.01)
*H01R 13/11* (2006.01)

(52) U.S. Cl.
CPC ........... *H01R 12/724* (2013.01); *H01R 13/11* (2013.01)

(58) Field of Classification Search
CPC .............................. H01R 12/724; H01R 13/11
See application file for complete search history.

(56) References Cited

U.S. PATENT DOCUMENTS 4,533,203 A 8/1985 Feldman et al.
4,693,529 A 9/1987 Stillie
4,693,530 A 9/1987 Stillie et al.
4,761,144 A 8/1988 Hunt, III et al.
5,122,064 A 6/1992 Zarreii
5,184,964 A 2/1993 Douty et al.
(Continued)

FOREIGN PATENT DOCUMENTS

CN 1304568 A 7/2001
DE 91 07 627 U1 8/1991
(Continued)

OTHER PUBLICATIONS

Extended European Search Report dated Jan. 18, 2017 in connection with European Application No. 14775056.6.
(Continued)

*Primary Examiner* — Harshad C Patel
(74) *Attorney, Agent, or Firm* — Wolf, Greenfield & Sacks, P.C.

(57) ABSTRACT

An electrical connector includes an insulative housing and conductive power and signal terminals. The housing has a mating interface that engages with a mating connector. The power terminals and signal terminals are attached to the housing and exposed at the mating interface. The housing is configured to be mounted on a circuit board such that a side housing surface is aligned with an edge of the circuit board. The connector may have a right-angle configuration and may mate with a right-angle mating connector such that an edge of the circuit board of the connector and an edge of a circuit board of the mating connector are aligned edge to edge and directly face each other to form a flat pair, or may mate with a vertical mating connector to form a corner pair. The power terminals and the signals terminals may be arranged in arrays of columns and rows.

20 Claims, 21 Drawing Sheets

(56) References Cited

U.S. PATENT DOCUMENTS

| | | | | |
|---|---|---|---|---|
| 5,197,896 | A | 3/1993 | Landis et al. | |
| 5,535,100 | A | 7/1996 | Lubahn et al. | |
| 6,319,075 | B1 | 11/2001 | Clark et al. | |
| 6,848,950 | B2 | 2/2005 | Allison et al. | |
| 6,890,221 | B2 | 5/2005 | Wagner | |
| 6,923,661 | B1 * | 8/2005 | Bogiel | H01R 12/721 439/78 |
| D585,024 | S | 1/2009 | Kudo | |
| D597,956 | S | 8/2009 | Sakamoto | |
| 7,597,573 | B2 * | 10/2009 | Defibaugh | H01R 13/46 439/206 |
| 7,690,937 | B2 * | 4/2010 | Daily | H01R 12/725 439/79 |
| 7,727,001 | B2 * | 6/2010 | Percherke | H01R 12/724 439/378 |
| 7,762,857 | B2 | 7/2010 | Ngo et al. | |
| D639,746 | S | 6/2011 | Lee et al. | |
| D640,634 | S | 6/2011 | Lee et al. | |
| 8,057,266 | B1 * | 11/2011 | Roitberg | H01R 13/055 439/907 |
| 8,262,395 | B2 * | 9/2012 | Ke | H01R 27/02 439/79 |
| 8,388,389 | B2 | 3/2013 | Costello et al. | |
| 8,641,432 | B2 | 2/2014 | Northey | |
| 8,662,923 | B2 | 3/2014 | Wu | |
| 8,944,831 | B2 * | 2/2015 | Stoner | H05K 3/4038 439/108 |
| 9,153,887 | B2 | 10/2015 | Chen | |
| 9,401,558 | B1 * | 7/2016 | Yu | H01R 4/02 |
| 9,419,356 | B2 * | 8/2016 | Copper | H01R 12/7088 |
| 9,627,790 | B2 * | 4/2017 | Anderson | H01R 13/03 |
| 9,680,236 | B2 | 6/2017 | Ngo | |
| D791,082 | S | 7/2017 | Li et al. | |
| D792,849 | S | 7/2017 | Mugan et al. | |
| D801,278 | S | 10/2017 | Li et al. | |
| 9,780,517 | B2 | 10/2017 | Zerebilov | |
| D803,161 | S | 11/2017 | Li et al. | |
| D803,162 | S | 11/2017 | Li et al. | |
| 9,825,384 | B2 | 11/2017 | Kurkowski et al. | |
| 9,853,388 | B2 * | 12/2017 | Copper | H01R 13/11 |
| 10,050,395 | B2 | 8/2018 | Ngo et al. | |
| D835,044 | S | 12/2018 | Ramanna et al. | |
| D837,737 | S | 1/2019 | Li et al. | |
| 10,256,581 | B2 | 4/2019 | Shinmi | |
| 10,276,967 | B2 | 4/2019 | Ngo | |
| 10,389,060 | B2 | 8/2019 | Diessel et al. | |
| 10,424,887 | B2 | 9/2019 | Hirschman et al. | |
| 10,879,647 | B2 | 12/2020 | Brungard | |
| D906,978 | S | 1/2021 | Ganamukhi et al. | |
| D911,964 | S | 3/2021 | Ganamukhi et al. | |
| D924,165 | S | 7/2021 | Zabjanovski et al. | |
| D924,166 | S | 7/2021 | Zabjanovski et al. | |
| D924,167 | S | 7/2021 | Zabjanovski et al. | |
| D926,700 | S | 8/2021 | Terajima et al. | |
| D930,593 | S | 9/2021 | Zabjanovski et al. | |
| 11,121,509 | B2 | 9/2021 | Wei et al. | |
| 11,189,946 | B2 | 11/2021 | Rubens et al. | |
| 11,296,448 | B2 * | 4/2022 | Xu | H01R 13/53 |
| D951,876 | S | 5/2022 | Zabjanovski et al. | |
| D975,024 | S | 1/2023 | Wei et al. | |
| 2002/0086575 | A1 | 7/2002 | Marpoe et al. | |
| 2002/0098743 | A1 * | 7/2002 | Schell | H01R 13/055 439/544 |
| 2006/0281354 | A1 | 12/2006 | Ngo et al. | |
| 2007/0293084 | A1 * | 12/2007 | Ngo | H01R 12/737 439/552 |
| 2008/0299838 | A1 | 12/2008 | Kopp | |
| 2009/0047814 | A1 | 2/2009 | Daamen | |
| 2009/0142953 | A1 * | 6/2009 | Patel | H01R 12/7088 439/345 |
| 2009/0142970 | A1 | 6/2009 | Patel et al. | |
| 2010/0041266 | A1 | 2/2010 | Data et al. | |
| 2011/0187348 | A1 | 8/2011 | Soneda et al. | |
| 2012/0289071 | A1 * | 11/2012 | Dodds | H01R 13/53 439/183 |
| 2015/0009607 | A1 | 1/2015 | Daamen et al. | |
| 2015/0056833 | A1 * | 2/2015 | Brungard | H01R 12/7088 29/842 |
| 2015/0364878 | A1 | 12/2015 | Orris | |
| 2016/0036156 | A1 | 2/2016 | Iihoshi | |
| 2016/0079704 | A1 | 3/2016 | Chen | |
| 2017/0036563 | A1 | 2/2017 | Degner et al. | |
| 2017/0149157 | A1 | 5/2017 | Anderson et al. | |
| 2017/0214165 | A1 | 7/2017 | Brungard et al. | |
| 2018/0006414 | A1 | 1/2018 | Ooishi et al. | |
| 2018/0145463 | A1 | 5/2018 | Kiyuna et al. | |
| 2018/0219332 | A1 | 8/2018 | Brungard et al. | |
| 2018/0254573 | A1 * | 9/2018 | Copper | H01R 13/02 |
| 2018/0309227 | A1 | 10/2018 | Diessel et al. | |
| 2018/0351281 | A1 | 12/2018 | Takamura | |
| 2018/0351309 | A1 | 12/2018 | Shinmi | |
| 2019/0036422 | A1 | 1/2019 | Shirai et al. | |
| 2019/0123334 | A1 | 4/2019 | Kataoka et al. | |
| 2019/0140389 | A1 | 5/2019 | Yi et al. | |
| 2019/0239379 | A1 | 8/2019 | Smith et al. | |
| 2019/0288450 | A1 | 9/2019 | Brungard | |
| 2019/0288461 | A1 | 9/2019 | Kiyuna et al. | |
| 2020/0251846 | A1 | 8/2020 | Tian | |
| 2020/0328565 | A1 | 10/2020 | Wei et al. | |
| 2021/0218195 | A1 | 7/2021 | Hsu et al. | |

FOREIGN PATENT DOCUMENTS

| | | | |
|---|---|---|---|
| TW | 201112499 | A | 4/2011 |
| TW | D188004 | S | 1/2018 |
| TW | D192415 | S | 8/2018 |
| WO | 93/15532 | A1 | 8/1993 |
| WO | WO 2007/145793 | A2 | 12/2007 |

OTHER PUBLICATIONS

Partial Supplementary European Search Report dated Sep. 26, 2016 in connection with European Application No. 14775056.6.
Taiwanese Notice of Allowance dated Jul. 1, 2019 in connection with Taiwanese Application No. 108306346.
Wei et al., Electrical Connector, U.S. Appl. No. 29/860,885, filed Nov. 23, 2022.
Examination Report dated Mar. 31, 2025 in connection with European Application No. 22204409.1.
Extended European Search Report dated Mar. 23, 2023 in connection with European Application No. 22204409.1.
Taiwanese Office Action dated Mar. 10, 2026 in connection with Taiwanese Application No. 111141169.

* cited by examiner

FIG. 7A
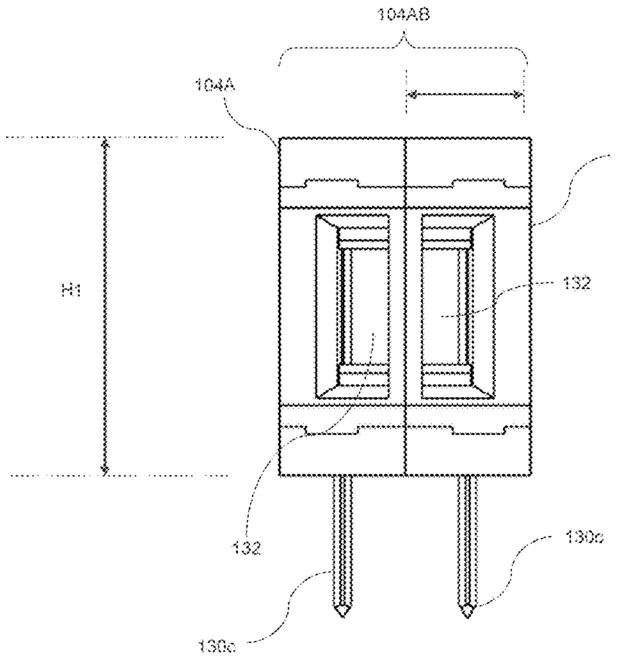
FIG. 7B
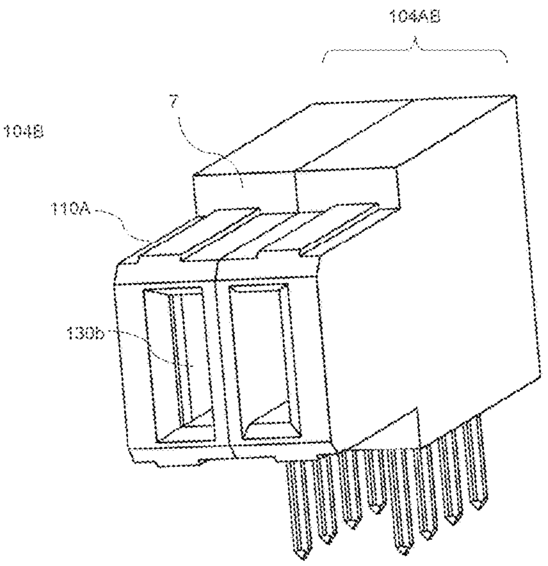
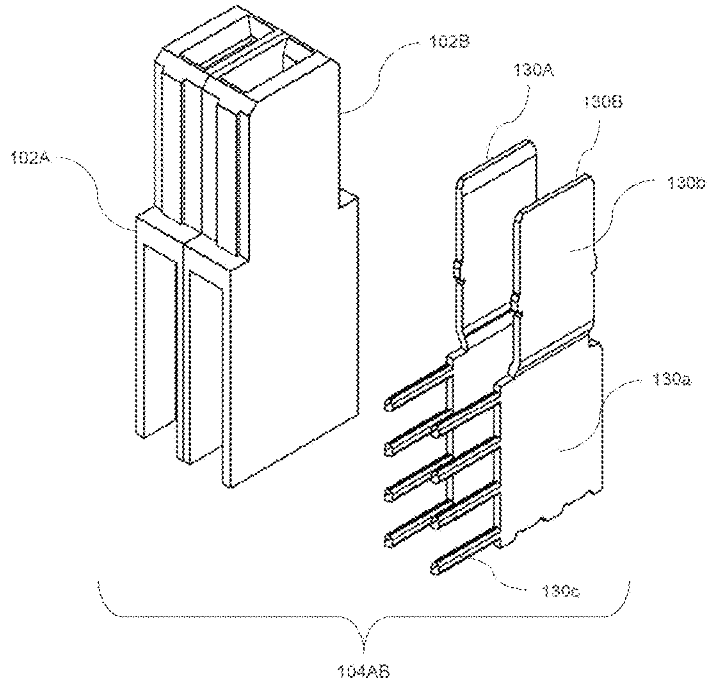
FIG. 7C
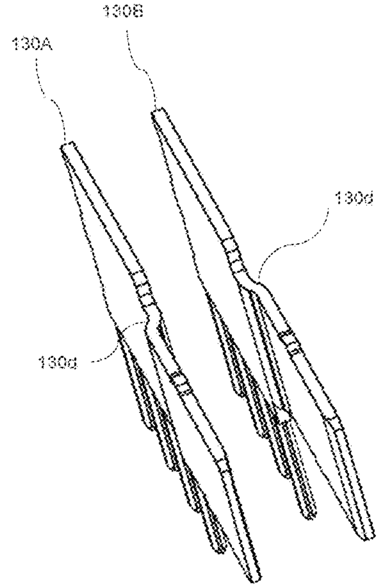
FIG. 7D

FIG. 8A
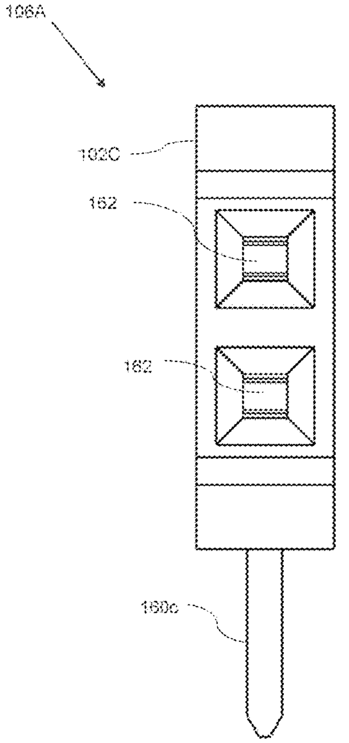
FIG. 8B
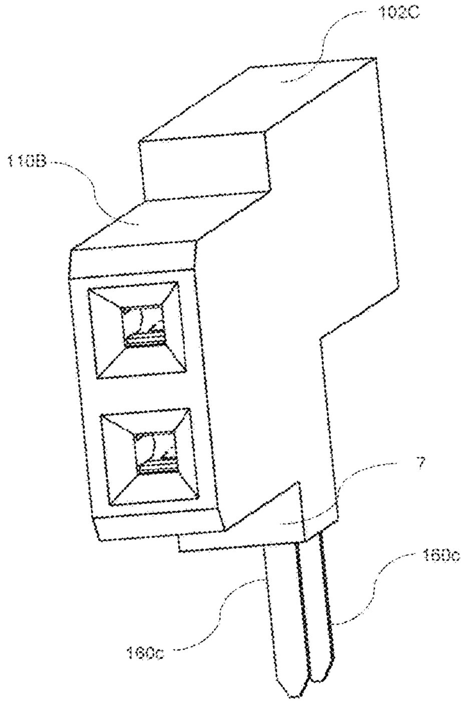
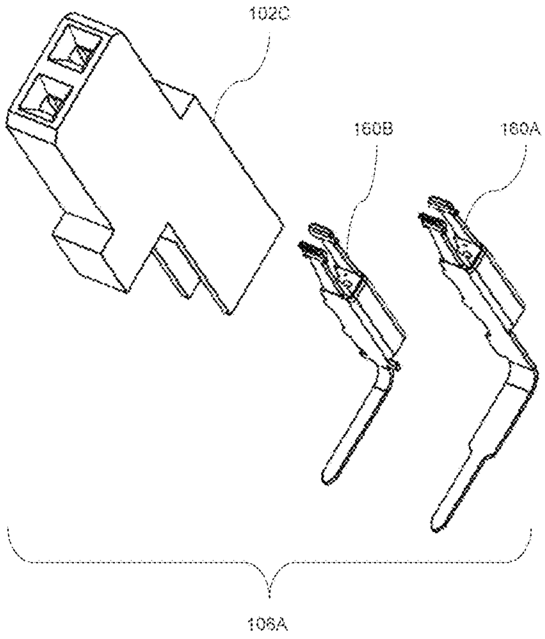
FIG. 8C
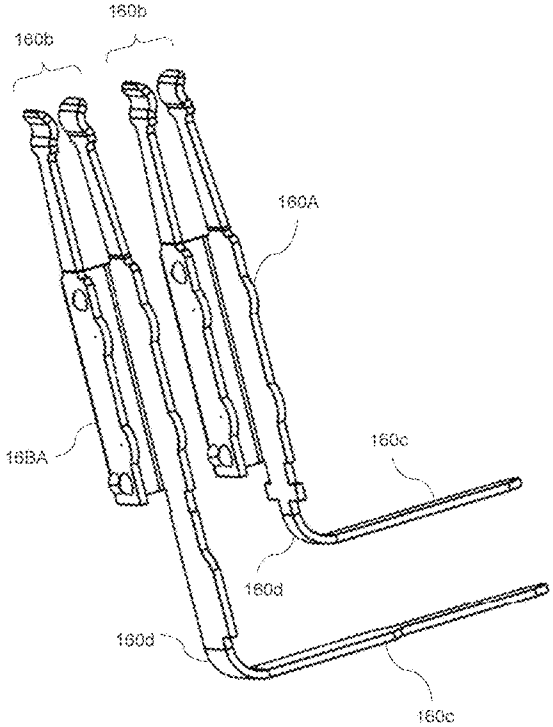
FIG. 8D

FIG. 9A
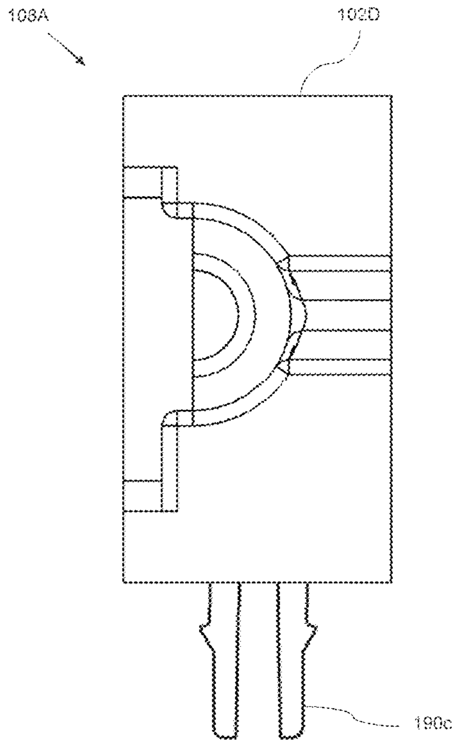
FIG. 9B
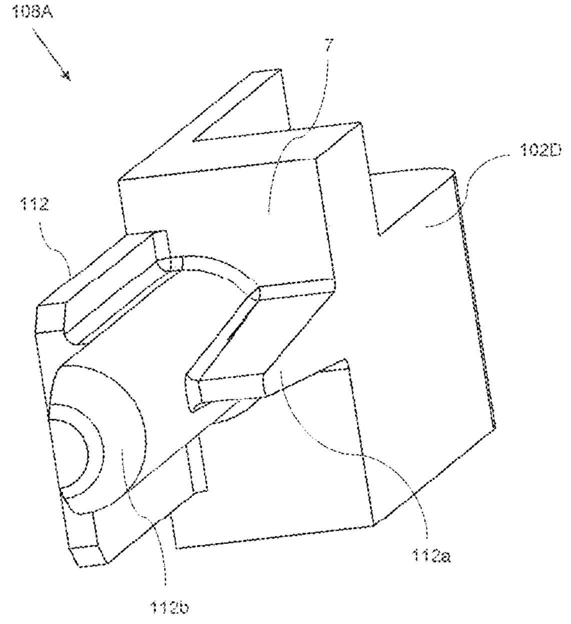
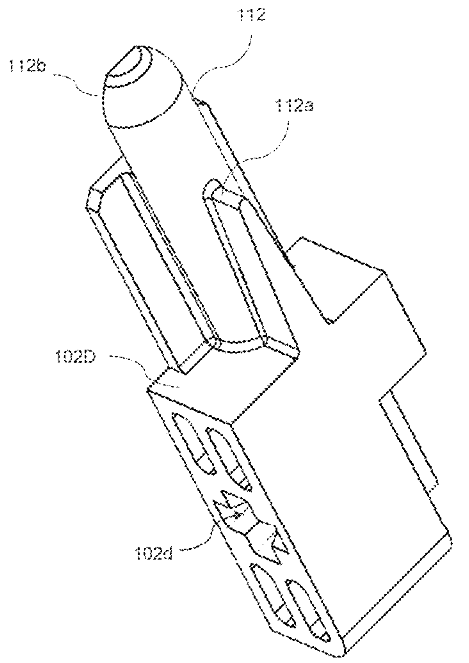
FIG. 9C
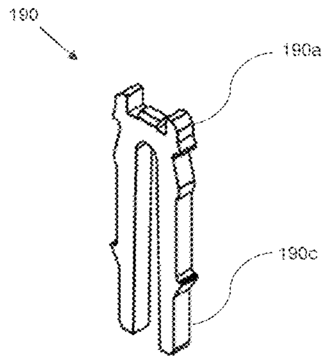
FIG. 9D

FIG. 11C
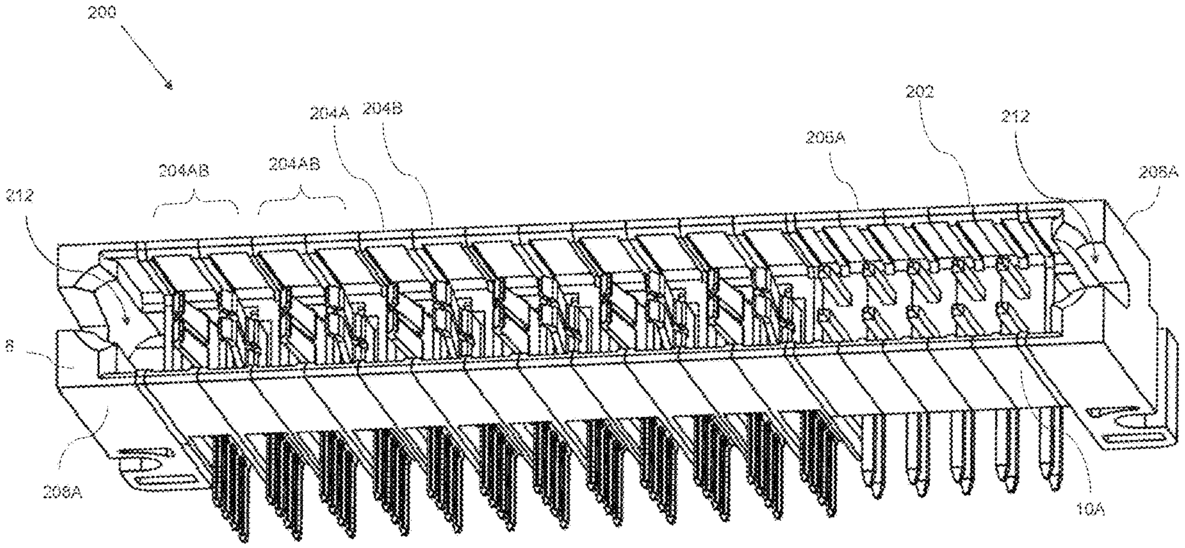
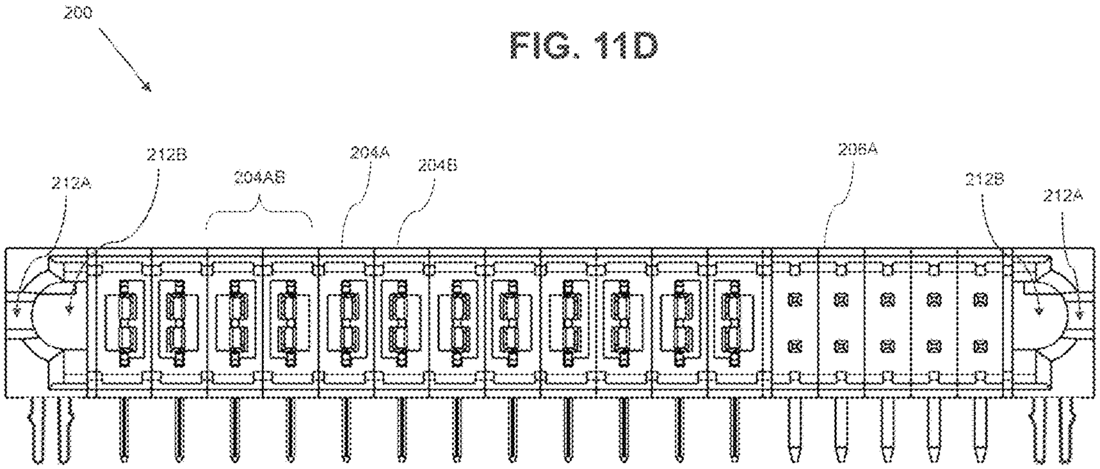
FIG. 11D

FIG. 12A
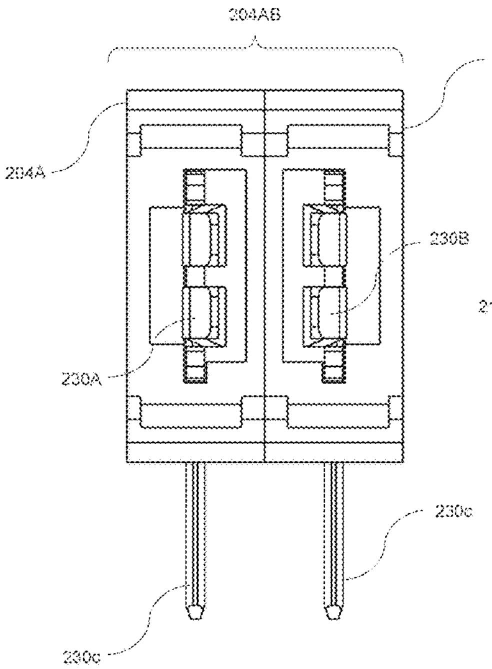
FIG. 12B
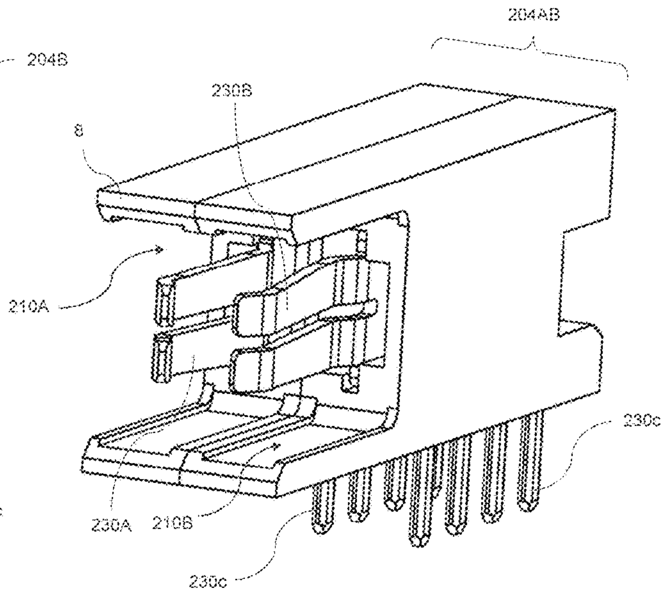
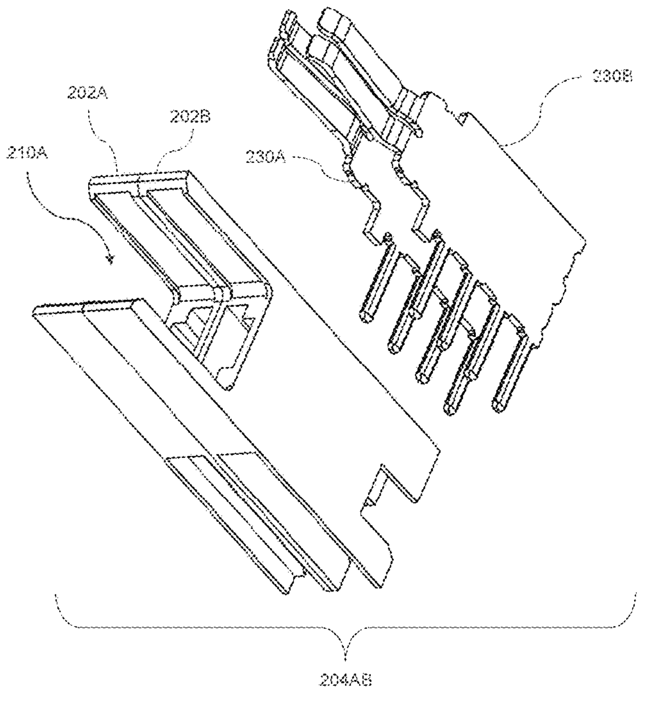
FIG. 12C
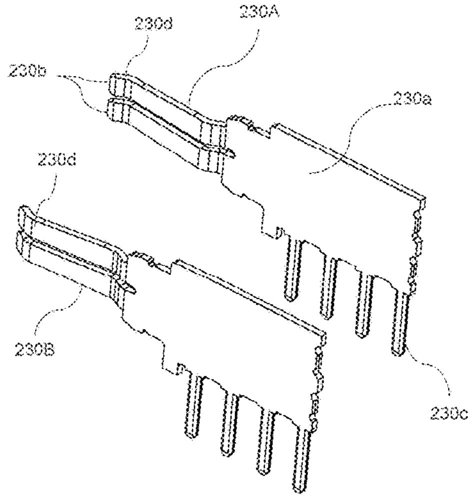
FIG. 12D

FIG. 13A
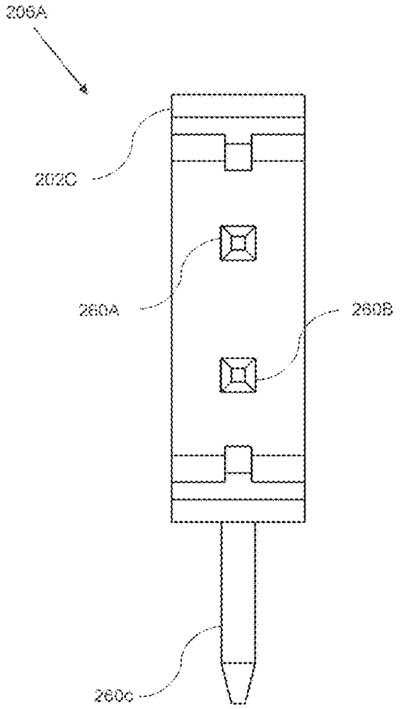
FIG. 13B
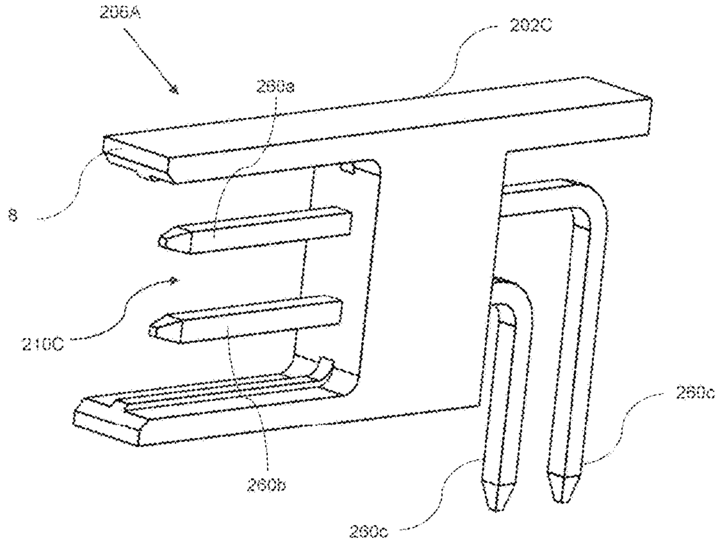
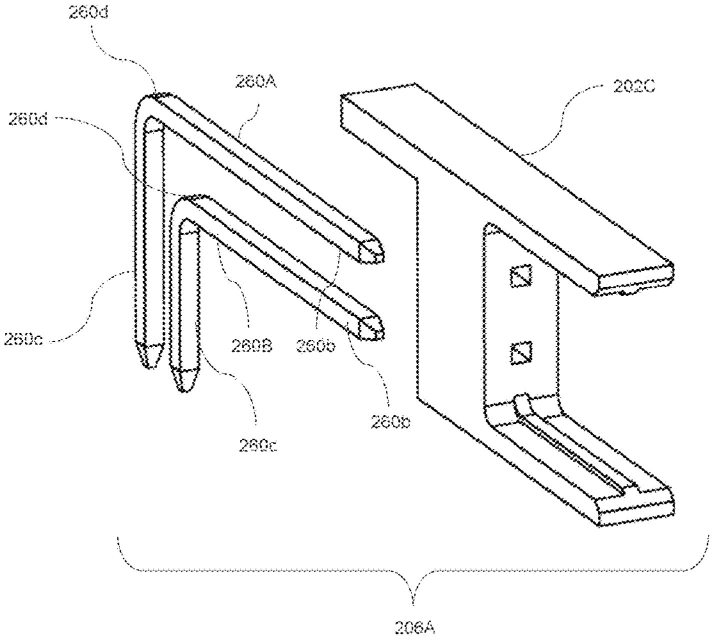
FIG. 13C

FIG. 14A
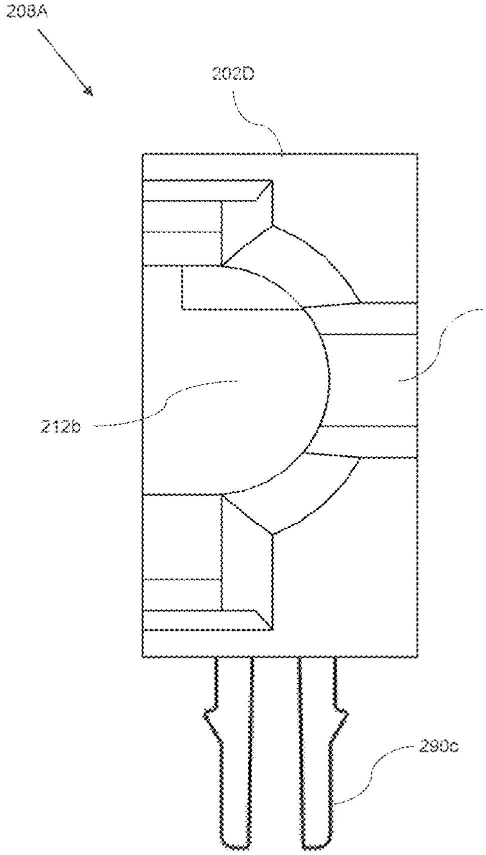
FIG. 14B
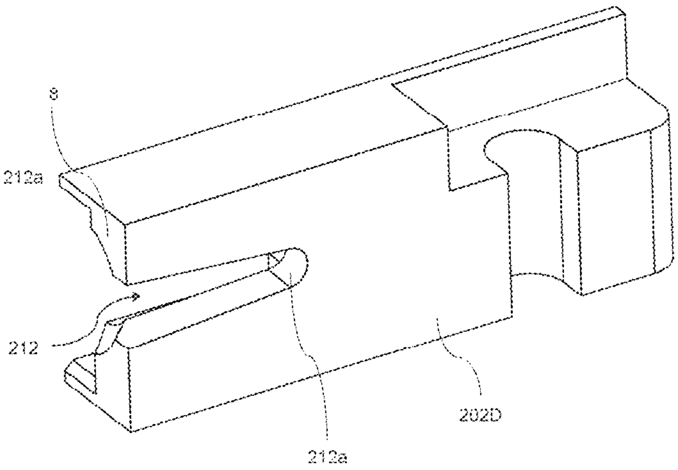
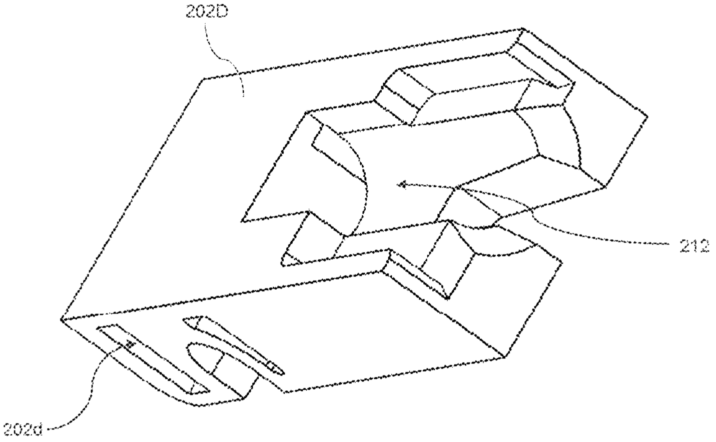
FIG. 14C
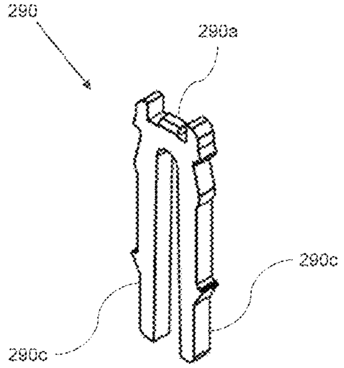
FIG. 14D

FIG. 16A
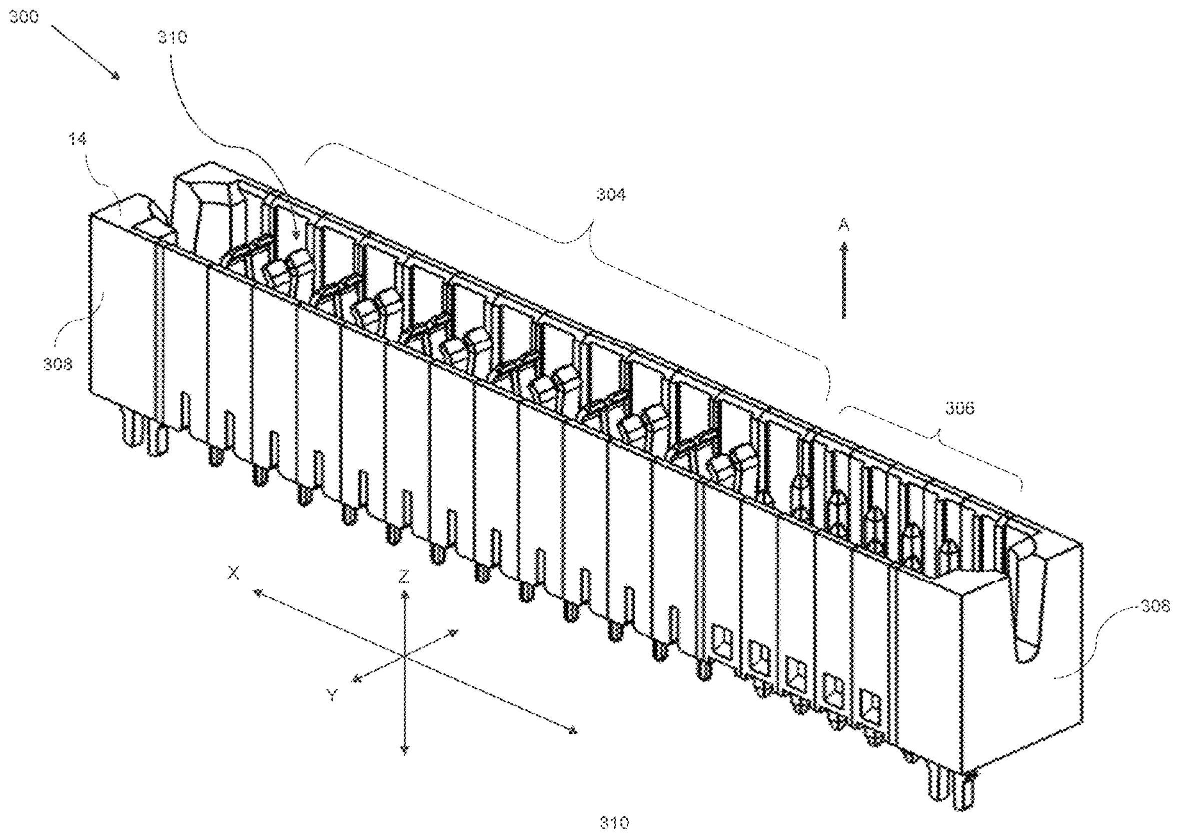
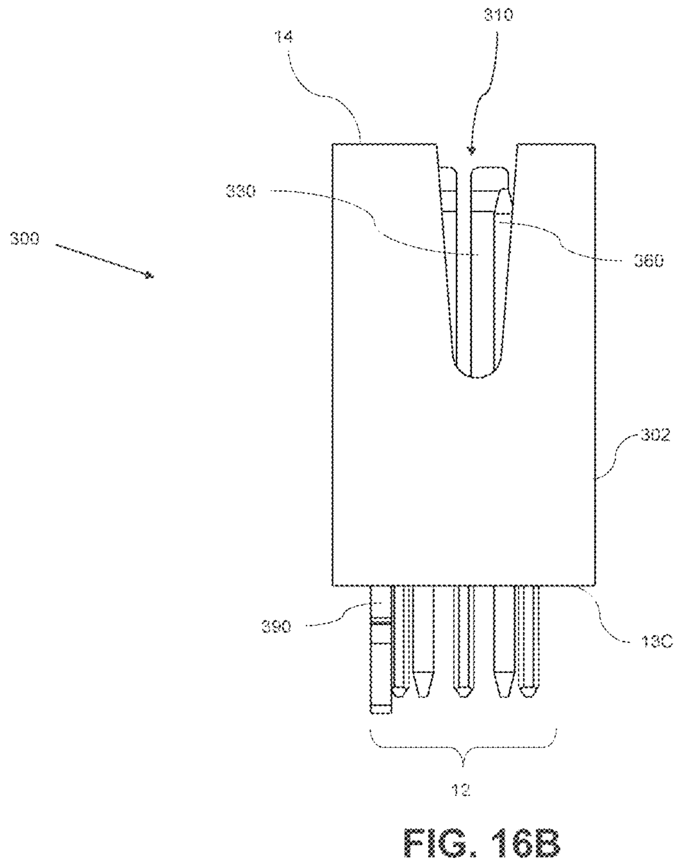
FIG. 16B

FIG. 17A
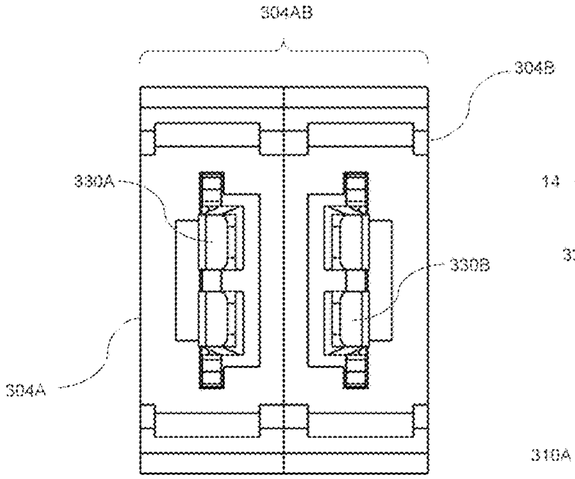
FIG. 17B
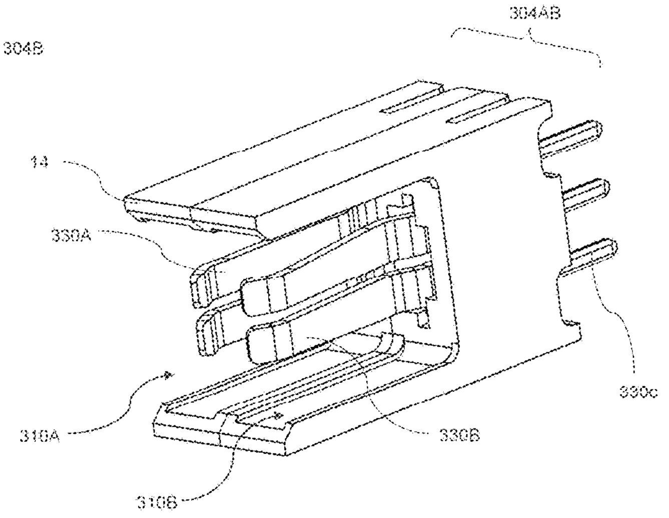
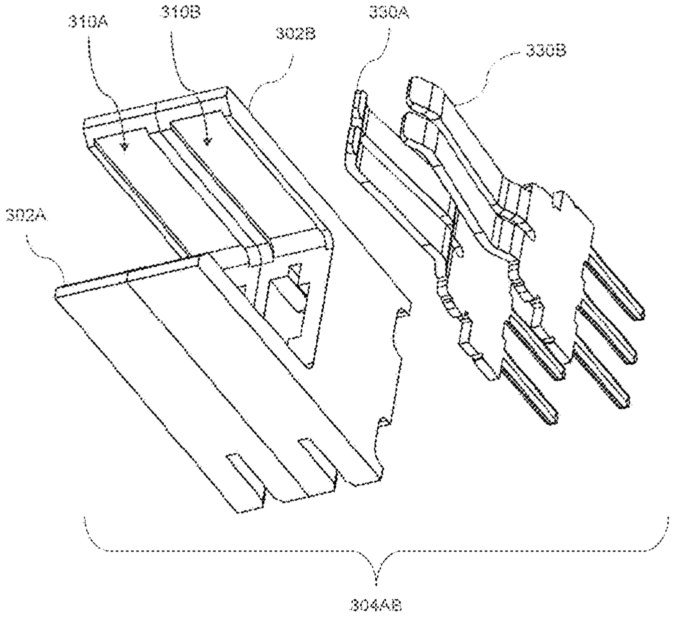
FIG. 17C
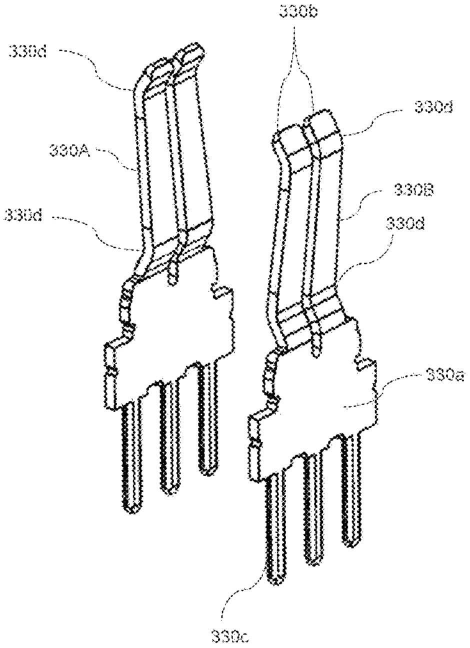
FIG. 17D

FIG. 18A
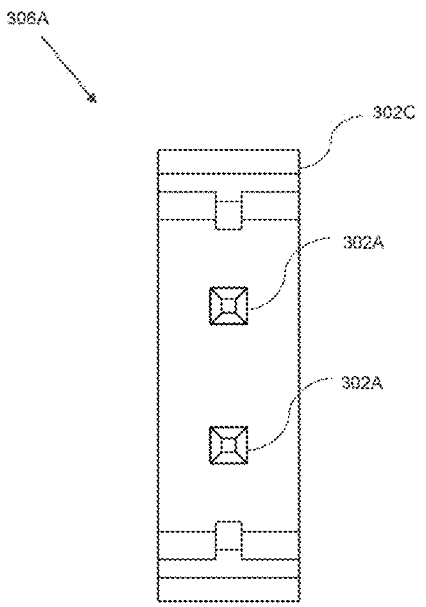
FIG. 18B
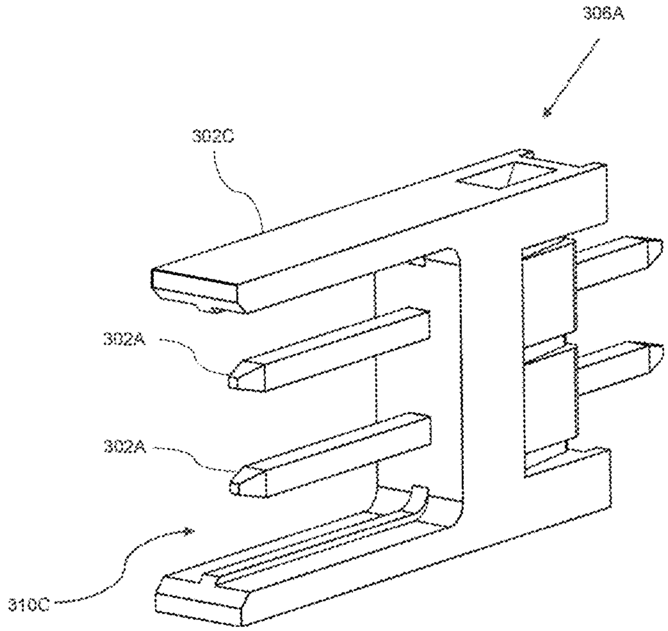
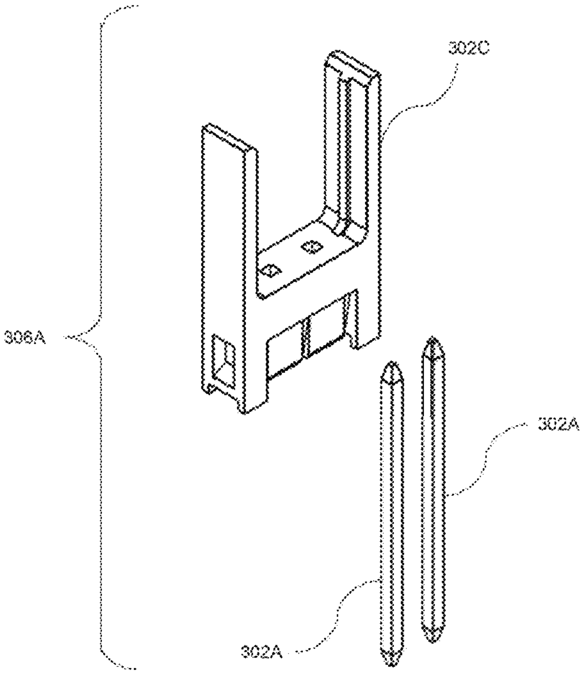
FIG. 18C

FIG. 19A
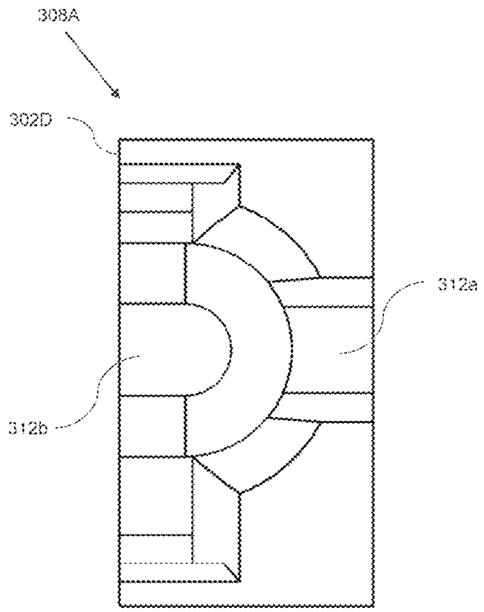
FIG. 19B
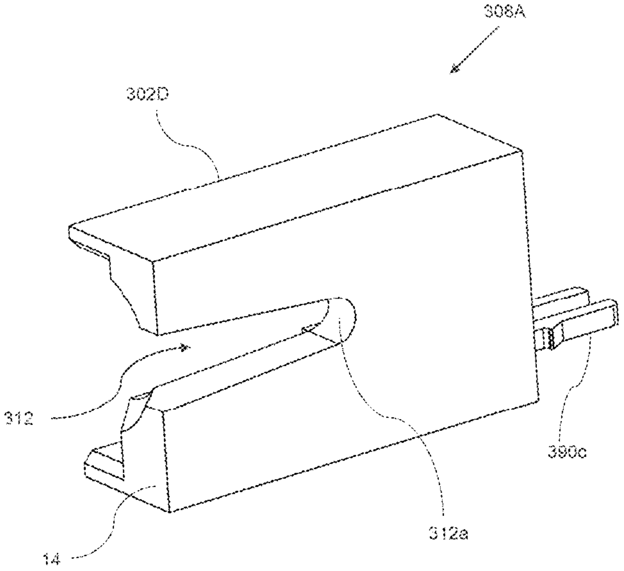
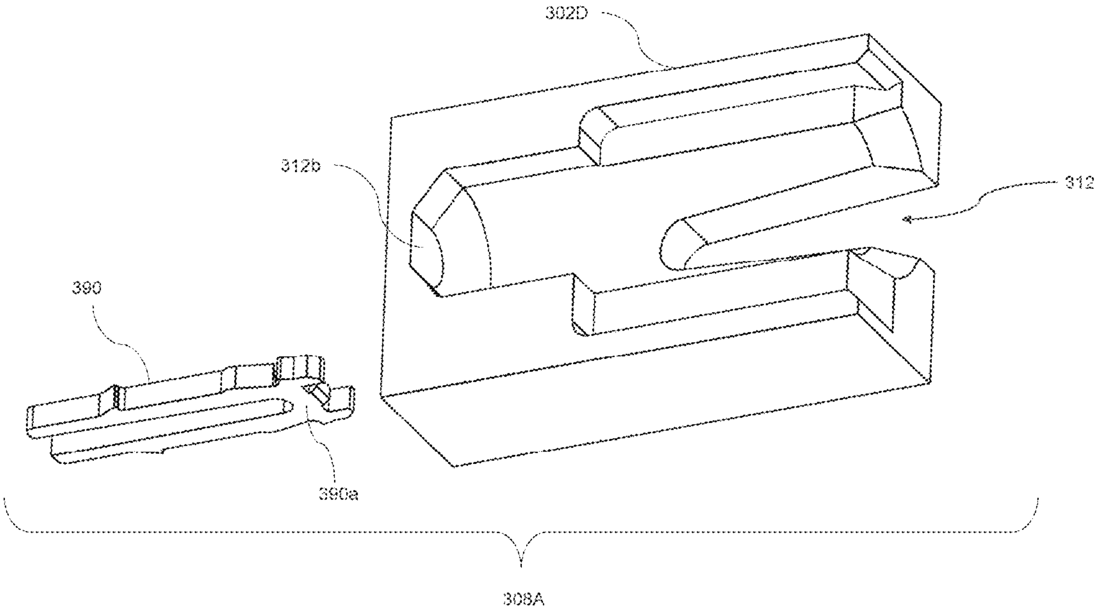
FIG. 19C

LOW-PROFILE ELECTRICAL CONNECTOR

CROSS-REFERENCE TO RELATED APPLICATIONS

The present application claims the benefit of priority of U.S. Provisional Application No. 63/273,323 filed Oct. 29, 2021, entitled "LOW-PROFILE ELECTRICAL CONNECTOR", the entire contents of which is incorporated by reference herein.

FIELD OF THE INVENTION

This disclosure relates generally to electrical interconnection systems and more specifically to low-profile electrical connectors for electrically interconnecting two circuit boards.

BACKGROUND

Electrical connectors are used in many electronic systems. In general, various electronic devices (e.g., smart phones, tablet computers, desktop computers, notebook computers, digital cameras, and the like) have been provided with assorted types of connectors whose primary purpose is to enable separable connections for exchanging power, data, commands, and/or other signals between subassemblies of an electronic device. Electrical connectors are basic components needed to make some electrical systems functional. Connectors in many configurations are commercially available, differing in design based on the device configuration in which they are intended to be used, as well as other parameters of use, such as number and speed of data signals and/or the amount of current or number of power circuits that are to pass through the connector. Mechanical parameters of connector operation may also vary from connector to connector, such as the desired mating or contact force.

As a result of the range of parameters that may impact connector selection and performance, a designer of an electronic system may spend considerable time on connector selection and qualification. As the designer creates designs for a new device, the designer may investigate available connectors to select a particular connector as a candidate for use in manufacture of the device. Before manufacturing that device in quantity, however, the designer may qualify the selected connector, including testing the performance and reliability of the selected connector to ensure that it work in the device when mass produced. This selection and qualification can be time consuming and may be repeated for each new device design as well as modifications of an existing device design that results in the need to select a different connector.

As electronic devices become smaller and smaller, electrical connectors may need to be deployed in very small spaces. One factor designers may take into consideration in manufacturing a small electronic device is whether there is room to house all the electrical connections required for proper functioning of the electronic device.

SUMMARY

According to aspects of the present technology, an electrical connector is provided. The electrical connector may be comprised of: an insulative housing comprised of a mating interface configured to face a mating connector when the electrical connector and the mating connector are in a mated position; a plurality of conductive power terminals attached to the housing and exposed at the mating interface; and a plurality of conductive signal terminals attached to the housing and exposed at the mating interface. The housing may be configured to be mounted on a circuit board such that a side surface of the housing is aligned with an edge of the circuit board.

In an aspect, the side surface of the housing may be configured to be aligned with the edge of the circuit board such that, when the electrical connector and the mating connector are in the mated position, the circuit board is parallel with a corresponding circuit board on which the mating connector is mounted such that the edge of the circuit board faces an edge of the corresponding circuit board. In some embodiments of this aspect, the housing may be configured to be mounted on the circuit board such that a bottom surface of the housing faces a surface of the circuit board and a top surface of the housing faces away from the surface of the circuit board, the side surface of the housing may be perpendicular to the bottom surface of the housing, and a height of the housing, extending perpendicularly from the bottom surface of the housing to the top surface of the housing, may be in a range from 5.0 mm to 14.0 mm. For example, the height of the housing may be in a range from 6.0 mm to 12.0 mm.

In some embodiments of this aspect, each of the power terminals may be comprised of a body portion, a mounting portion extending in a first direction from the body portion, and a contact portion extending in a second direction from the body portion, the second direction being perpendicular to the first direction. The mounting portions of the power terminals may be configured to be attached to the circuit board, and the contact portions of the power terminals may be configured to contact corresponding power terminals of the mating connector when the electrical connector and the mating connector are in the mated position. The contact portions of the power terminals may be aligned in a row direction parallel to the bottom surface of the housing, and the height of the housing may be in a range from 6.5 mm to 8.5 mm. In some embodiments, the power terminals may be comprised of pairs of first and second power terminals. For each of the pairs of first and second power terminals, the contact portion of the first power terminal may be a mirror image of the contact portion of the second power terminal. In some embodiments, the contact portions of the power terminals may be arranged in an array comprised of a plurality of columns aligned perpendicular to the bottom surface of the housing and a plurality of rows aligned parallel to the bottom surface of the housing, and the height of the housing may be in a range from 10.0 mm to 12.0 mm. In some embodiments, each of the columns of the array may be comprised of a pair of first and second power terminals of the power terminals, in which the first power terminals of the array are aligned in a first row, and in which the second power terminals of the array are aligned in a second row. For each column of the array, the contact portion the first power terminal may be a mirror image of the contact portion of the second power terminal.

In some embodiments of this aspect, each of the signal terminals may be comprised of a mounting portion extending in a first direction and a contact portion extending in a second direction, the second direction being perpendicular to the first direction, the mounting portions of the signal terminals may be configured to be attached to the circuit board, and the contact portions of the signal terminals may be configured to contact corresponding signal terminals of the mating connector when the electrical connector and the mating connector are in the mated position. In some embodiments, the contact portions of the signal terminals may be arranged in an array comprised of a plurality of columns aligned perpendicular to the bottom surface of the housing and a plurality of rows aligned parallel to the bottom surface of the housing.

In some embodiments of this aspect, the housing may be comprised of first and second mounting ends located on opposite sides of the housing, and the housing may be configured to be attached to the circuit board by first and second retainer clips respectively disposed in the first and second mounting ends. In some embodiments, each of the first and second mounting ends of the housing may be comprised of an alignment structure configured to engage with a corresponding alignment structure of the mating connector when the electrical connector and the mating connector are in the mated position.

In another aspect, the electrical connector may be a receptacle connector. In some embodiments of this aspect, the mating interface of the housing may be comprised of a protruding engagement section that extends beyond the side surface of the housing, and the engagement section of the mating interface may be comprised of a plurality of first contact openings through which the power terminals are exposed and a plurality of second contact openings through which the signal terminals are exposed. In some embodiments, when the housing is mounted on the circuit board, a mating direction of the electrical connector with the mating connector may be parallel to a surface of the circuit board. In some embodiments, the engagement section of the mating interface may be configured to be received in an accommodation space of the mating connector when the electrical connector and the mating connector are in the mated position.

In some embodiments of this aspect, the contact portions of the power terminals and the contact portions of the signal terminals may be disposed in the engagement section of the mating interface. The contact portions of the power terminals may be comprised of power tabs. For each of the power terminals, the power tab and the mounting portion may extend from the body portion in perpendicular directions. In some embodiments, the power terminals may be aligned in a row direction in pairs comprised of a first power terminal and a second power terminal and, for each of the pairs of the power terminals, a distance in the row direction between a midpoint of the first contact opening corresponding to the first power terminal and a midpoint of the first contact opening corresponding to the second power terminal may be in a range from 2.5 mm to 3.5 mm. For adjacent pairs of the power terminals, a distance between the midpoints of the first contact openings corresponding to the first power terminals may be in a range from 5.5 mm to 6.5 mm. In some embodiments, for each of the pairs of the power terminals, a contact surface of the power tab of the first power terminal and a contact surface of the power tab of the second power terminal may face in opposite directions.

In some embodiments of this aspect, the power terminals may be arranged such that the power tabs of the power terminals are disposed in the engagement section of the mating interface in columns and rows such that each column is comprised of a pair of first and second power terminals of the power terminals, and a length of the mounting portions of the first power terminals may be shorter than a length of the mounting portions of the second power terminals. In some embodiments, for each of the pairs of first and second power terminals, the power tab of the first power terminal may have a curved section that is a mirror image of a curved section of the power tab of the second power terminal. The power tabs of the power terminals may be configured to press against the corresponding power terminals of the mating connector when the electrical connector and the mating connector are in the mated position. In some embodiments, for each of the columns of the power terminals, a distance in a column direction between a midpoint of the first contact opening corresponding to the first power terminal and a midpoint of the first contact opening corresponding to the second power terminal may be in a range from 1.5 mm to 2.5 mm. For adjacent pairs of the first and second power terminals, a distance in a row direction between the midpoints of the first contact openings corresponding to the first power terminals may be in a range from 6.5 mm to 7.5 mm. In some embodiments, for each of the columns of the power terminals, a contact surface of the power tab of the first power terminal and a contact surface of the power tab of the second power terminal may face in opposite directions.

In some embodiments of this aspect, the contact portions of the signal terminals may be comprised of contact clips, and each of the contact clips may be configured to receive a corresponding signal-pin of the mating connector when the mating connector and the electrical connector are in the mated position. In some embodiments, each of the contact clips of the signal terminals may be comprised of: a first arm comprised of a first contact surface, and a second arm comprised of a second contact surface. For each of the contact clips, the first and second contact surfaces may face each other and may be configured to receive the corresponding signal-pin of the mating connector therebetween, with a distance between the first and second contact surfaces being such that the corresponding signal-pin is pinched by the first and second contact surfaces when the mating connector and the electrical connector are in the mated position. In some embodiments, for each of the signal terminals, the contact clip and the mounting portion may extend in perpendicular directions. In some embodiments, the signal terminals may be arranged such that the contact clips of the signal terminals are disposed in the engagement section of the mating interface in columns and rows such that each of the columns is comprised of the contact clips of at least two of the signal terminals. For each of the columns of the signal terminals, the mounting portions of the at least two of the signal terminals may have different lengths from each other. In some embodiments, each of the columns of the signal terminals may be comprised of a first signal terminal and a second signal terminal, and a shape of the mounting portion of the first signal terminal may be different from a shape of the mounting portion of the second signal terminal.

In some embodiments of this aspect, each of the alignment structures of the first and second mounting ends of the housing may be comprised of a multi-level protrusion configured to be received in a corresponding mating recess of the mating connector when the mating connector and the electrical connector are in the mated position. The engagement section of the mating interface may extend beyond the side surface of the housing by a first distance, and each of the multi-level protrusions may extend beyond the side surface of the housing by a second distance greater than the first distance. In some embodiments, each of the multi-level protrusions may be comprised of a sublevel that extends beyond the side surface of the housing by a third distance less than the second distance and greater than the first distance. In some embodiments, the multi-level protrusions of the first and second end portions may be contiguous with the engagement section of the mating interface, and, in a mating operation, the multi-level protrusions may be received in the corresponding mating recesses of the mating connector before the engagement section is received in an accommodation space of the mating connector.

In another aspect, the electrical connector may be a plug connector. In some embodiments of this aspect, the side surface of the housing may be an outermost surface of the housing and may be configured to be aligned with the edge of the circuit board such that no part of the housing extends beyond the edge of the circuit board when the housing is mounted on the circuit board. The mating interface of the housing may be comprised of an accommodation space configured to receive a protruding engagement section of the mating connector when the electrical connector and the mating connector are in the mated position. When the housing is mounted on the circuit board, a mating direction of the electrical connector with the mating connector may be parallel to a surface of the circuit board. The contact portions of the power terminals and the contact portions of the signal terminals may be disposed in the accommodation space.

In some embodiments of this aspect, for each of the power terminals, the contact portion may be comprised of a set of fingers extending from the body portion in the first direction. The fingers may be configured to press against a corresponding power tab of the mating connector when the mating connector and the electrical connector are in the mated position. For each of the power terminals, the fingers and the mounting portion may extend from the body portion in perpendicular directions. In some embodiments, the power terminals may be aligned in a row direction in pairs comprised of a first power terminal and a second power terminal. For each of the pairs of the power terminals, a distance in the row direction between a midpoint of the body portion of the first power terminal and a midpoint of the body portion of the second power terminal may be in a range from 2.5 mm to 3.5 mm. For adjacent pairs of the power terminals, a distance between midpoints of the first power terminals may be in a range from 5.5 mm to 6.5 mm. In some embodiments, for each of the pairs of the power terminals, a contact surface of the set of fingers of the first power terminal and a contact surface of the set of fingers of the second power terminal may face in opposite directions.

In some embodiments of this aspect, the power terminals may be arranged such that the sets of fingers of the power terminals are disposed in the accommodation space of the mating interface in columns and rows such that each column is comprised of a pair of first and second power terminals of the power terminals. For each of the columns of the power terminals, a length of the mounting portion of the first power terminal may be shorter than a length of the mounting portion of the second power terminal. In some embodiments, for each of the columns of the power terminals, the fingers of the first power terminal may have a curved section that is a mirror image of a curved section of the fingers of the second power terminal. In some embodiments, for each of the columns of the power terminals, a distance in a column direction between a midpoint of the first power terminal and a midpoint of the second power terminal may be in a range from 1.5 mm to 2.5 mm. In some embodiments, for adjacent columns of the power terminals, a distance in a row direction between the midpoints of the first power terminals may be in a range from 6.5 mm to 7.5 mm. In some embodiments, for each of the columns of the power terminals, a contact surface of the set of fingers of the first power terminal and a contact surface of the set of fingers of the second power terminal may face in opposite directions.

In some embodiments of this aspect, the contact portions of the signal terminals may be comprised of contact pins, and each of the contact pins may be configured to be inserted in a corresponding signal clip of the mating connector when the mating connector and the electrical connector are in the mated position. In some embodiments, for each of the signal terminals, the contact pin and the mounting portion may extend in perpendicular directions. In some embodiments, the signal terminals may be arranged such that the contact pins of the signal terminals are disposed in the accommodation space of the mating interface in columns and rows such that each column is comprised of the contact pins of at least two of the signal terminals. For each of the columns of the signal terminals, the mounting portions of the at least two of the signal terminals may have different lengths from each other. For each of the columns of the signal terminals, the contact pins of the at least two of the signal terminals may have lengths that are different from each other.

In some embodiments of this aspect, each of the alignment structures of the first and second mounting ends of the housing may be comprised of a multi-level recess configured to receive a corresponding mating protrusion of the mating connector when the mating connector and the electrical connector are in the mated position. The accommodation space of the mating interface may extend from the side surface into the housing by a first distance, and each of the multi-level recesses may extend from the side surface into the housing by a second distance greater than the first distance. In some embodiments, each of the multi-level recesses may be comprised of a sublevel that extends from the side surface into the housing by a third distance less than the second distance and greater than the first distance. In some embodiments, the multi-level recesses of the first and second end portions may be contiguous with the accommodation space of the mating interface. In a mating operation, the multi-level recesses may receive the corresponding mating protrusions of the mating connector before the accommodation space receives the engagement section of the mating connector.

In another aspect, the electrical connector may a plug connector. Each of the power terminals may be comprised of: a body portion, a mounting portion extending in a first direction from the body portion and configured to be attached to the circuit board when the housing is mounted on the circuit board, and a contact portion extending in a second direction from the body portion and configured to contact a corresponding power terminal of the mating connector when the electrical connector and the mating connector are in the mated position, the second direction being opposite to the first direction. Each of the signal terminals may be comprised of: a mounting portion extending in the first direction and configured to be attached to the circuit board when the housing is mounted on the circuit board, and a contact portion extending in the second direction and configured to contact a corresponding signal terminal of the mating connector when the electrical connector and the mating connector are in the mated position. The mating interface of the housing may be comprised of an accommodation space configured to receive a protruding engagement section of the mating connector when the electrical connector and the mating connector are in the mated position. When the housing is mounted on the circuit board, a mating direction of the electrical connector with the mating connector may be perpendicular to a surface of the circuit board. The contact portions of the power terminals and the contact portions of the signal terminals may be disposed in the accommodation space.

In some embodiments of this aspect, when the housing is mounted on the circuit board, the side surface of the housing may face a surface of the circuit board, a mating surface of the housing may face away from the surface of the circuit board, and top and bottom surfaces of the housing may be perpendicular to the circuit board. A height of the housing, extending perpendicularly from the bottom surface of the housing to the top surface of the housing, may be in a range from 5.0 mm to 14.0 mm.

In some embodiments of this aspect, for each of the power terminals, the contact portion may be comprised of a set of fingers extending from the body portion in the first direction, the fingers being configured to press against a corresponding power tab of the mating connector when the mating connector and the electrical connector are in the mated position. In some embodiments, for each of the power terminals, the set of fingers and the mounting portion may extend from the body portion in opposite directions. In some embodiments, the power terminals may be aligned in a row direction in pairs comprised of first and second power terminals of the power terminals. For each of the pairs of first and second power terminals, a distance in the row direction between a midpoint of the first power terminal and a midpoint of the second power terminal may be in a range from 2.5 mm to 3.5 mm. In some embodiments, a distance between the set of fingers of the first power terminals of adjacent pairs of the power terminals may be in a range from 5.5 mm to 6.5 mm. In some embodiments, for each of the pairs of the power terminals, a contact surface of the fingers of the first power terminal and a contact surface of the fingers of the second power terminal may face in opposite directions. In some embodiments, the power terminals may be arranged such that the sets of fingers of the power terminals are disposed in the accommodation space of the mating interface in columns and rows such that each column is comprised of a pair of first and second power terminals of the power terminals. In some embodiments, for each of the columns of the power terminals, the fingers of the first power terminal may have a curved section that is a mirror image of a curved section of the fingers of the second power terminal. In some embodiments, for each of the columns of the power terminals, a distance in a column direction between a midpoint of the first power terminal and a midpoint of the second power terminal may be in a range from 1.5 mm to 2.5 mm. In some embodiments, for adjacent pairs of the power terminals, a distance in a row direction between the midpoints of the first power terminals may be in a range from 6.5 mm to 7.5 mm. In some embodiments, for each of the columns of the power terminals, a contact surface of the fingers of the first power terminal and a contact surface of the fingers of the second power terminal may face in opposite directions.

In some embodiments of this aspect, the contact portions of the signal terminals may be comprised of contact pins, and each of the contact pins may be configured to be inserted in a corresponding signal clip of the mating connector when the mating connector and the electrical connector are in the mated position. In some embodiments, the signal terminals may be arranged such that the contact pins of the signal terminals are disposed in the accommodation space of the mating interface in columns and rows such that each column is comprised of the contact pins of at least two of the signal terminals.

In some embodiments of this aspect, each of the alignment structures of the first and second mounting ends of the housing may be comprised of a multi-level recess configured to receive a corresponding mating protrusion of the mating connector when the mating connector and the electrical connector are in the mated position. The accommodation space of the mating interface may extend from the mating surface into the housing by a first distance, and each of the multi-level recesses may extend from the mating surface into the housing by a second distance greater than the first distance. In some embodiments, each of the multi-level protrusions may be comprised of a sublevel that extends from the mating surface into the housing by a third distance less than the second distance and greater than the first distance. In some embodiments, the multi-level recesses of the first and second end portions may be contiguous with the accommodation space of the housing. In a mating operation, the multi-level recesses may receive the corresponding mating protrusions of the mating connector before the accommodation space receives the engagement section of the mating connector.

In another aspect, the housing may have a segmented construction such that the housing is comprised of: a plurality of first housing portions aligned in a row direction, with each of the first housing portions being configured to support at least one of the power terminals, a plurality of second housing portions aligned in the row direction, with each of the second housing portions being configured to support a group of the signal terminals, and first and second end housing portions located on opposite ends and sandwiching the first and second housing portions therebetween. In some embodiments of this aspect, each of the first housing portions may be configured to support at least two of the power terminals aligned in a column direction.

According to further aspects of the present technology, an electrical connector is provided. The electrical connector may be comprised of: a plurality of power segments aligned in a row direction, each of the power segments being comprised of at least one conductive power terminal attached to a first insulative housing portion, each of the power terminals being configured to be attached to a circuit board; a plurality of signal segments aligned in the row direction, each of the signal segments being comprised of a plurality of conductive signal terminals attached to a second insulative housing portion, each of the signal terminals being configured to be attached to the circuit board; a first end segment comprised of a first insulative end portion and a first retainer clip attached to the first insulative end portion, the first retainer clip being configured to be attached to the circuit board, and a second end segment comprised of a second insulative end portion and a second retainer clip attached to the second insulative end portion, the second retainer clip being configured to be attached to the circuit board. The power segments and the signal segments may be disposed between the first and second end segments. Each of the first and second end segments may be comprised of a mating structure configured to engage with a corresponding mating structure of a mating connector when the electrical connector and the mating connector are in a mated position. The power segments and the signal segments may be sandwiched between the first and second end segments. The first and second housing portions and the first and second end portions may be attached to each other to form a housing comprised of a mating interface configured to engage with a mating interface of the mating connector when the electrical connector and the mating connector are in the mated position. A side surface of the housing may be aligned with an edge of the circuit board when the first and second end segments are attached to the circuit board by the first and second retainer clips.

In some embodiments of this aspect, when the first and second end segments are attached to the circuit board, the side surface of housing may be aligned with the edge of the circuit board such that, when the electrical connector and the mating connector are in the mated position, the circuit board is parallel with a corresponding circuit board on which the mating connector is mounted such that the edge of the circuit board faces an edge of the corresponding circuit board. In some embodiments, when the first and second end segments are attached to the circuit board, a bottom surface of the housing may face a surface of the circuit board and a top surface of the housing may face away from the surface of the circuit board. The side surface of the housing may be perpendicular to the bottom surface of the housing. A height of the housing, which extends perpendicularly from the bottom surface of the housing to the top surface of the housing, may be in a range from 5.0 mm to 14.0 mm. In some embodiments, the height of the housing may be in a range from 6.0 mm to 12.0 mm.

In some embodiments of this aspect, each of the power terminals may be comprised of a body portion, a mounting portion extending in a first direction from the body portion, and a contact portion extending in a second direction from the body portion, the second direction being perpendicular to the first direction. The mounting portions of the power terminals may be configured to be attached to the circuit board. The contact portions of the power terminals may be configured to contact corresponding power terminals of the mating connector when the electrical connector and the mating connector are in the mated position. In some embodiments, the height of the housing may be in a range from 6.5 mm to 8.5 mm.

In some embodiments of this aspect, the power segments may be comprised of pairs of first and second power segments, with each of the first power segments being comprised of a first power terminal of the power terminals, and with each of the second power segments being comprised of a second power terminal of the power terminals. In some embodiments, the first and second power segments may be arranged in an alternating order in the row direction. In some embodiments, for each of the pairs of first and second power segments, the contact portion of the first power terminal may be a mirror image of the contact portion of the second power terminal.

In some embodiments of this aspect, each of the power segments may be comprised of a pair of the power terminals, and the pairs of the power terminals may be arranged in an array comprised of a plurality of columns aligned perpendicular to the bottom surface of the housing and a plurality of rows aligned parallel to the bottom surface of the housing. In some embodiments, the height of the housing may be in a range from 10.0 mm to 12.0 mm. In some embodiments, for each of the columns of the array, the contact portions of the pair of the power terminals may be mirror images of each other.

In some embodiments of this aspect, each of the signal terminals may be comprised of a mounting portion extending in a first direction and a contact portion extending in a second direction, the second direction being perpendicular to the first direction. The mounting portions of the signal terminals may be configured to be attached to the circuit board, and the contact portions of the signal terminals may be configured to contact corresponding signal terminals of the mating connector when the electrical connector and the mating connector are in the mated position. In some embodiments, the contact portions of the signal terminals may be arranged in an array comprised of a plurality of columns aligned perpendicular to the bottom surface of the housing and a plurality of rows aligned parallel to the bottom surface of the housing.

In an aspect, the electrical connector may be a receptacle connector. In some embodiments, the power segments and the signal segments may be configured such that the mating interface of the housing is comprised of protruding engagement section that extends beyond the side surface of housing, and the engagement section of the mating interface is comprised of a plurality of first contact openings through which the power terminals are exposed and a plurality of second contact openings through which the signal terminals are exposed. When the housing is mounted on the circuit board, a mating direction of the electrical connector with the mating connector may be parallel to a surface of the circuit board. The engagement section of the mating interface may be configured to be received in an accommodation space of the mating connector when the electrical connector and the mating connector are in the mated position.

In some embodiments of this aspect, the contact portions of the power terminals and the contact portions of the signal terminals may be disposed in the engagement section of the mating interface. The contact portions of the power terminals may be comprised of power tabs. For each of the power terminals, the power tab and the mounting portion may extend in perpendicular directions. In some embodiments, the power segments may be comprised of pairs of first and second power segments, with each of the first power segments being comprised of a first power terminal of the power terminals, and with each of the second power segments being comprised of a second power terminal of the power terminals. For each of the pairs of first and second power segments, a distance in the row direction between a midpoint of the first contact opening corresponding to the first power terminal and a midpoint of the first contact opening corresponding to the second power terminal may be in a range from 2.5 mm to 3.5 mm. For adjacent pairs of the first and second power segments, a distance between the midpoints of the first contact openings corresponding to the first power segments may be in a range from 5.5 mm to 6.5 mm. In some embodiments, for each of the pairs of first and second power segments, a contact surface of the power tab of the first power terminal and a contact surface of the power tab of the second power terminal may face in opposite directions.

In some embodiments of this aspect, the power terminals may be arranged in an array comprised of a plurality of columns aligned perpendicular to the bottom surface of the housing and a plurality of rows aligned parallel to the bottom surface of the housing. Each of the power segments may correspond to a column of the array and may be comprised of a first power terminal and a second power terminal of the power terminals. A length of the mounting portions of the first power terminals of the array may be shorter than a length of the mounting portions of the second power terminals of the array. In some embodiments, for each of the power segments, the power tab of the first power terminal may have a curved section that is a mirror image of a curved section of the power tab of the second power terminal. The power tabs of the power terminals may be configured to press against the corresponding power terminals of the mating connector when the electrical connector and the mating connector are in the mated position. In some embodiments, for each of the power segments, a distance in a column direction between a midpoint of the first contact opening corresponding to the first power terminal and a midpoint of the first contact opening corresponding to the second power terminal may be in a range from 1.5 mm to 2.5 mm. In some embodiments, for adjacent pairs of the power segments, a distance in a row direction between the midpoints of the first contact openings corresponding to the first power terminals may be in a range from 6.5 mm to 7.5 mm. In some embodiments, for each of the power segments, a contact surface of the power tab of the first power terminal and a contact surface of the power tab of the second power terminal may face in opposite directions.

In some embodiments of this aspect, the contact portions of the signal terminals may be comprised of contact clips, and each of the contact clips may be configured to receive a corresponding signal-pin of the mating connector when the mating connector and the electrical connector are in the mated position. In some embodiments, each of the contact clips of the signal terminals may be comprised of: a first arm comprised of a first contact surface, and a second arm comprised of a second contact surface. For each of the contact clips, the first and second contact surfaces may face each other and may be configured to receive the corresponding signal-pin of the mating connector therebetween, with a distance between the first and second contact surfaces being such that the corresponding signal-pin is pinched by the first and second contact surfaces when the mating connector and the electrical connector are in the mated position. In some embodiments, for each of the signal terminals, the contact clip and the mounting portion may extend in perpendicular directions. In some embodiments, the signal terminals may be arranged such that the contact clips of the signal terminals are disposed in the engagement section of the mating interface in columns and rows such that each of the columns is comprised of the contact clips of at least two of the signal terminals. Each of the signal segments may correspond to a column of the array, and, for each of the signal segments, the mounting portions of the at least two of the signal terminals may have different lengths from each other. In some embodiments, each of the signal segments may be comprised of a first signal terminal and a second signal terminal, and a shape of the mounting portion of the first signal terminal may be different from a shape of the mounting portion of the second signal terminal.

In some embodiments of this aspect, each of the mating structures of the first and second end segments may be comprised of a multi-level protrusion configured to be received in a corresponding mating recess of the mating connector when the mating connector and the electrical connector are in the mated position. The engagement section of the mating interface may extend beyond the side surface of the housing by a first distance, and each of the multi-level protrusions may extend beyond the side surface of the housing by a second distance greater than the first distance. In some embodiments, each of the multi-level protrusions may be comprised of a sublevel that extends beyond the side surface of the housing by a third distance less than the second distance and greater than the first distance. In some embodiments, the multi-level protrusions of the first and second end segments may be contiguous with the engagement section of the mating interface. In a mating operation, the multi-level protrusions may be received in the corresponding mating recesses of the mating connector before the engagement section is received in an accommodation space of the mating connector.

In another aspect, the electrical connector may be a plug connector. In some embodiments, the side surface of the housing may be an outermost surface of the housing and may be configured to be aligned with the edge of the circuit board such that no part of the housing extends beyond the edge of the circuit board when the first and second end segments are attached to the circuit board. The mating interface of the housing may be comprised of an accommodation space configured to receive a protruding engagement section of the mating connector when the electrical connector and the mating connector are in the mated position. When the first and second end segments are attached to the circuit board, a mating direction of the electrical connector with the mating connector may be parallel to a surface of the circuit board. The contact portions of the power terminals and the contact portions of the signal terminals may be disposed in the accommodation space.

In some embodiments of this aspect, for each of the power terminals, the contact portion may be comprised of a set of fingers extending from the body portion in the first direction, with the fingers being configured to press against a corresponding power tab of the mating connector when the mating connector and the electrical connector are in the mated position. For each of the power terminals, the set of fingers and the mounting portion may extend from the body portion in perpendicular directions. In some embodiments, the power segments may be comprised of pairs of first and second power segments, with each of the first power segments being comprised of a first power terminal of the power terminals, and with each of the second power segments being comprised of a second power terminal of the power terminals. For each of the pairs of first and second power segments, a distance in the row direction between a midpoint of the first power segment and a midpoint of the second power segment may be in a range from 2.5 mm to 3.5 mm. For adjacent pairs of first and second power segments, a distance between the midpoints of the first power segments may be in a range from 5.5 mm to 6.5 mm. In some embodiments, for each of the pairs of first and second power segments, a contact surface of the set fingers of the first power terminal and a contact surface of the set fingers of the second power terminal may face in opposite directions.

In some embodiments of this aspect, the power terminals may be arranged in an array comprised of a plurality of columns aligned perpendicular to the bottom surface of the housing and a plurality of rows aligned parallel to the bottom surface of the housing. Each of the power segments may correspond to a column of the array and may be comprised of a first power terminal and a second power terminal of the power terminals. A length of the mounting portions of the first power terminals of the array may be shorter than a length of the mounting portions of the second power terminals of the array. In some embodiments, for each of the power segments, the set of fingers of the first power terminal may have a curved section that is a mirror image of a curved section of the set of fingers of the second power terminal. The fingers of the power terminals may be configured to press against the corresponding power terminals of the mating connector when the electrical connector and the mating connector are in the mated position. In some embodiments, for each of the power segments, a distance in a column direction between a midpoint of the body portion of the first power terminal and a midpoint of the body portion of the second power terminal may be in a range from 1.5 mm to 2.5 mm. In some embodiments, for adjacent pairs of the power segments, a distance in a row direction between the midpoints of the body portions of the first power terminals may be in a range from 6.5 mm to 7.5 mm. In some embodiments, for each of the power segments, a contact surface of the set of fingers of the first power terminal and a contact surface of the set of fingers of the second power terminal may face in opposite directions.

In some embodiments of this aspect, the contact portions of the signal terminals may be comprised of contact pins, and each of the contact pins may be configured to be inserted in a corresponding signal clip of the mating connector when the mating connector and the electrical connector are in the mated position. In some embodiments, for each of the signal terminals, the contact pin and the mounting portion may extend in perpendicular directions. In some embodiments, the signal terminals may be arranged such that the contact pins of the signal terminals are disposed in the accommodation space of the mating interface in columns and rows such that each column is comprised of the contact pins of at least two of the signal terminals. Each of the signal segments may correspond to a column of the array. For each of the signal segments, the contact pins of the at least two of the signal terminals may have different lengths from each other.

In some embodiments of this aspect, each of the mating structures of the first and second end segments may be comprised of a multi-level recess configured to receive a corresponding mating protrusion of the mating connector when the mating connector and the electrical connector are in the mated position. The accommodation space of the mating interface may extend from the side surface into the housing by a first distance, and each of the multi-level recesses may extend from the side surface into the housing by a second distance greater than the first distance. In some embodiments, each of the multi-level recesses may be comprised of a sublevel that extends from the side surface into the housing by a third distance less than the second distance and greater than the first distance. In some embodiments, the multi-level recesses of the first and second end portions may be contiguous with the accommodation space of the mating interface. In a mating operation, the multi-level recesses may receive the corresponding mating protrusions of the mating connector before the accommodation space receives the engagement section of the mating connector.

In another aspect, the electrical connector may be a plug connector. Each of the power terminals may be comprised of: a body portion, a mounting portion extending in a first direction from the body portion and configured to be attached to the circuit board, and a contact portion extending in a second direction from the body portion and configured to contact a corresponding power terminal of the mating connector when the electrical connector and the mating connector are in the mated position, the second direction being opposite to the first direction. Each of the signal terminals may be comprised of: a mounting portion extending in the first direction and configured to be attached to the circuit board, and a contact portion extending in the second direction and configured to contact a corresponding signal terminal of the mating connector when the electrical connector and the mating connector are in the mated position. The mating interface of the housing may be comprised of an accommodation space configured to receive a protruding engagement section of the mating connector when the electrical connector and the mating connector are in the mated position. When the first and second end segments are attached to the circuit board, a mating direction of the electrical connector with the mating connector may be perpendicular to a surface of the circuit board. The contact portions of the power terminals and the contact portions of the signal terminals may be disposed in the accommodation space.

In some embodiments of this aspect, when the first and second end segments are attached to the circuit board, the side surface of the housing may face a surface of the circuit board, a mating surface of the housing may face away from the surface of the circuit board, and top and bottom surfaces of the housing may be perpendicular to the circuit board. A height of the housing, extending perpendicularly from the bottom surface of the housing to the top surface of the housing, may be in a range from 5.0 mm to 14.0 mm.

In some embodiments of this aspect, for each of the power terminals, the contact portion may be comprised of a set of fingers extending from the body portion in the first direction, with the fingers being configured to press against a corresponding power tab of the mating connector when the mating connector and the electrical connector are in the mated position. In some embodiments, for each of the power terminals, the set of fingers and the mounting portion may extend from the body portion in opposite directions. In some embodiments, the power segments may be comprised of pairs of first and second power segments, with each of the first power segments being comprised of a first power terminal of the power terminals, and with each of the second power segments being comprised of a second power terminal of the power terminals. For each of the pairs of first and second power segments, a distance in the row direction between a midpoint of the first power segment and a midpoint of the second power segment may be in a range from 2.5 mm to 3.5 mm. In some embodiments, for adjacent pairs of the first and second power segments, a distance between the midpoints of the first power segments may be in a range from 5.5 mm to 6.5 mm. In some embodiments, for each of the pairs of first and second power segments, a contact surface of the set of fingers of the first power terminal and a contact surface of the set of fingers of the second power terminal face in opposite directions.

In some embodiments of this aspect, the power terminals may be arranged in an array comprised of a plurality of columns aligned perpendicular to the bottom surface of the housing and a plurality of rows aligned parallel to the bottom surface of the housing. Each of the power segments may correspond to a column of the array and may be comprised of a first power terminal and a second power terminal of the power terminals. A length of the mounting portions of the first power terminals of the array may be shorter than a length of the mounting portions of the second power terminals of the array. In some embodiments, for each of the power segments, the set of fingers of the first power terminal may have a curved section that is a mirror image of a curved section of the set of fingers of the second power terminal. The fingers of the power terminals may be configured to press against power tabs of the corresponding power terminals of the mating connector when the electrical connector and the mating connector are in the mated position. In some embodiments, for each of the power segments, a distance in a column direction between a midpoint of the body portion of the first power terminal and a midpoint of the body portion of the second power terminal may be in a range from 1.5 mm to 2.5 mm. In some embodiments, a distance in a row direction between midpoints of the body portions of the first power terminals of an adjacent pair of the power segments may be in a range from 6.5 mm to 7.5 mm. In some embodiments, for each of the power segments, a contact surface of the fingers of the first power terminal and a contact surface of the fingers of the second power terminal may face in opposite directions.

In some embodiments of this aspect, the contact portions of the signal terminals may be comprised of contact pins, and each of the contact pins may be configured to be inserted in a corresponding signal clip of the mating connector when the mating connector and the electrical connector are in the mated position. In some embodiments, for each of the signal terminals, the contact pin and the mounting portion may extend in opposite directions. In some embodiments, the signal terminals may be arranged such that the contact pins of the signal terminals are disposed in the accommodation space of the mating interface in an array of columns and rows such that each column is comprised of contact pins of at least two of the signal terminals. Each of the signal segments may correspond to a column of the array.

In some embodiments of this aspect, each of the mating structures of the first and second end segments may be comprised of a multi-level recess configured to receive a corresponding mating protrusion of the mating connector when the mating connector and the electrical connector are in the mated position. The accommodation space of the mating interface may extend from the mating surface into the housing by a first distance, and each of the multi-level recesses may extend from the mating surface into the housing by a second distance greater than the first distance. In some embodiments, each of the multi-level protrusions may be comprised of a sublevel that extends from the mating surface into the housing by a third distance less than the second distance and greater than the first distance. In some embodiments, the multi-level recesses of the first and second end portions may be contiguous with the accommodation space of the mating interface. In a mating operation, the multi-level recesses may receive the corresponding mating protrusions of the mating connector before the accommodation space receives the engagement section of the mating connector.

The foregoing features may be used, separately or together in any combination, in any of the embodiments discussed herein.

BRIEF DESCRIPTION OF DRAWINGS

Various aspects and embodiments of the present technology disclosed herein are described below with reference to the accompanying figures. It should be appreciated that the figures are not necessarily drawn to scale. Items appearing in multiple figures may be indicated by the same reference numeral. For the purposes of clarity, not every component may be labeled in every figure.

FIGS. 7A and 7B are an elevational front view and a perspective top front view of an exemplary embodiment of a pair of power segments of the receptacle connector of FIG. 1.

FIG. 7C is a perspective bottom front view of the pair of power segments of FIG. 7A in a partially disassembled state.

FIG. 7D is a perspective top front view of an exemplary embodiment of a pair of power terminals of the pair of power segments of FIG. 7A.

FIGS. 8A and 8B are an elevational front view and a perspective top front view of an exemplary embodiment of a signal segment of the receptacle connector of FIG. 1.

FIG. 8C is a perspective bottom front view of the signal segment of FIG. 8A in a partially disassembled state.

FIG. 8D is a perspective top rear view of an exemplary embodiment of signal terminals of the signal segment of FIG. 8A.

FIGS. 9A and 9B are an elevational front view and a perspective top front view of an exemplary embodiment of an end segment of the receptacle connector of FIG. 1.

FIG. 9C is a perspective bottom front view of an exemplary embodiment of a housing portion of the end segment of FIG. 9A.

FIG. 9D is a perspective top view of an exemplary embodiment of a retainer clip of the end segment of FIG. 9A.

FIG. 11C is a perspective bottom front view of the plug connector of FIG. 1.

FIG. 11D is an elevational front view of the plug connector of FIG. 1.

FIGS. 12A and 12B are an elevational front view and a perspective top front view of an exemplary embodiment of a pair of power segments of the plug connector of FIG. 1.

FIG. 12C is a perspective bottom front view of the pair of power segments of FIG. 12A in a partially disassembled state.

FIG. 12D is a perspective top rear view of an exemplary embodiment of a pair of power terminals of the pair of power segments of FIG. 12A.

FIGS. 13A and 13B are an elevational front view and a perspective top front view of an exemplary embodiment of a signal segment the plug connector of FIG. 1.

FIG. 13C is a perspective top front view of the signal segment of FIG. 13A in a partially disassembled state.

FIGS. 14A and 14B are an elevational front view and a perspective top front view of an exemplary embodiment of an end segment of the plug connector of FIG. 1.

FIG. 14C is a perspective bottom front view of an exemplary embodiment of a housing portion of the end segment of FIG. 14A.

FIG. 14D is a perspective top view of an exemplary embodiment of a retainer clip of the end segment of FIG. 14A.

FIG. 16A is a perspective top view of the plug connector of FIG. 2.

FIG. 16B is an elevational side view of the plug connector of FIG. 2.

FIGS. 17A and 17B are a plan top view and a perspective top view of an exemplary embodiment of a pair of power segments of the plug connector of FIG. 2.

FIG. 17C is a perspective top view of the pair of power segments of FIG. 17A in a partially disassembled state.

FIG. 17D is a perspective top view of an exemplary embodiment of a pair of power terminals of the pair of power segments of FIG. 17A.

FIGS. 18A and 18B are a plan top view and a perspective top view of an exemplary embodiment of a signal segment of the plug connector of FIG. 2.

FIG. 18C is a perspective top view of the signal segment of FIG. 18A in a partially disassembled state.

FIG. 19A is a plan top view of an exemplary embodiment of an end segment of the plug connector of FIG. 2.

FIG. 19B is a perspective view of an exemplary embodiment of an external side of the end segment of FIG. 19A.

FIG. 19C is a perspective view of an exemplary embodiment of an internal side of the end segment of FIG. 19A in a partially disassembled state.

DETAILED DESCRIPTION

Figure 1:
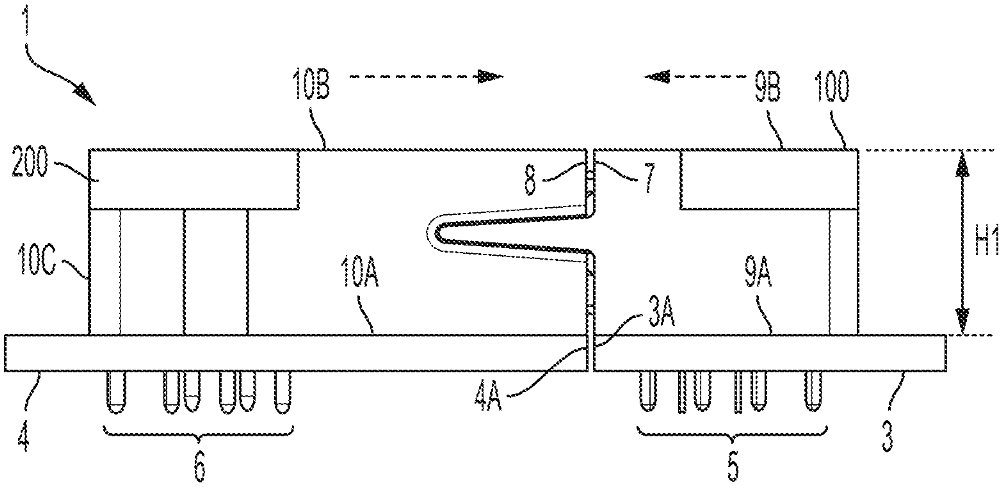
FIG. 1 is an elevational side view of an exemplary embodiment of a right-angle receptacle connector and an exemplary embodiment of a right-angle plug connector in a mated position and mounted on respective circuit boards.

The inventors have recognized and appreciated design techniques for connectors that may ease the burden of connector selection and qualification. These techniques may enable connectors that may be easily configured for any of a number of applications with consistent mating interfaces and other properties. Designers of electronic devices may develop a design using a connector of one configuration and easily and confidently adapt their design to use a connector, based on the same design techniques, for another configuration, which eases the burden of selection and qualification. As one example, the design techniques may facilitate variation in the amount of power carried by a circuit and/or the number of circuits within a connector.

The inventors also have recognized and appreciated design techniques for electrical connectors that enable mated plug and receptacle connectors to have a low profile while providing reliable operation for high-integrity electrical interconnects. Techniques and technology described herein may lead to compact and ultra-low-profile connectors able to interconnect two circuit boards via a high density of terminals. As an example, circuit boards on which the electrical connectors are mounted may be oriented edge-to-edge to enable ultra-low-profile "flat" interconnections, which may be advantageous to fit in a narrow flat space. In another example, circuit boards on which the electrical connectors are mounted may be oriented perpendicularly to enable ultra-low-profile corner interconnections, which may be advantageous to fit in a narrow corner space.

According to some aspects, a receptacle connector and a plug connector may form a flat board-to-board type of connection configuration. The receptacle connector may be a right-angle connector attached to a first circuit board such that an edge of the first circuit board aligns with a mating surface or interface of the receptacle connector. The plug connector may be a right-angle connector attached to a second circuit board such that an edge of the second circuit board aligns with a mating surface or interface of the receptacle connector. When the receptacle connector and the plug connector are in a mated position, the edges of the first and second circuit boards face each other and may even touch. As will be appreciated, the mating surface of the receptacle connector need not be an outermost surface, and a portion of the connector may protrude beyond the mating surface and may be configured to be inserted in a space of the plug connector. Similarly, the mating surface of the plug connector need not be an outermost surface, and a portion of the connector may protrude beyond the mating surface and may be configured to be inserted in a space of the receptacle connector.

According to some aspects, a receptacle connector and a plug connector may form a corner type of connection configuration. The receptacle connector may be a right-angle connector attached to a first circuit board such that at least one edge of the first circuit board aligns with at least one surface of the receptacle connector, respectively. The plug connector may be a vertical connector attached to a second circuit board such that an edge of the second circuit board aligns with at least one surface of the receptacle connector, respectively. When the receptacle connector and the plug connector are in a mated position, an edge of the first circuit board may be aligned with a surface of the receptacle connector forming one side of a corner, and an edge of the second circuit board may be aligned with a surface of the receptacle connector forming another side of the corner.

According to some aspects, a connector may have a segmented construction, which may provide flexibility to configure segment, e.g., to obtain a desired number of signal terminals and/or a desired number of power terminals in each connector. In some embodiments, the connector may be comprised of a plurality of segments connected consecutively. For example, the connector may be comprised of a plurality of signal segments and a plurality of power segments aligned in a row. Each power segment may be comprised of one power terminal or a column of two or more power terminals. Similarly, each signal segment may be comprised of one signal terminal or a column of two or more signal terminals.

In some embodiments, the segments of the connector may be separately formed and then joined together, such as by fusing an insulative housing of each segment to an insulative housing of an adjacent segment and/or by cementing or gluing each segment to an adjacent segment. Alternatively, insulative portions of the segments may be formed in a mold made up of segments corresponding to the segments of the connector. The mold segments may be held in a common fixture or otherwise held together to create a molded housing with a desired configuration of segments. Corresponding terminals may then be inserted into the segments of the molded housing. In this way, a connector may be formed with an insulative housing holding an array of signal terminals and at least one array of power terminals.

Alternatively or additionally, molds may be constructed for molding insulative housings for some or all of the desired connector configurations. Such housings may also have a signal portion and a power portion and any or all of the structures that may result from forming a connector housing from a plurality of segments as described herein. For example, the signal portion may be comprised of signal terminals inserted into the insulative housing and arranged in rows and columns. The power portion may be comprised of a plurality of rows of first power terminals and a plurality of rows of second power terminals inserted into the insulative housing.

Turning now to the figures, FIG. 1 shows a mated pair 1 of electrical connectors mounted on respective circuit boards 3, 4 in a board-to-board configuration, according to some embodiments. The mated pair 1 may be comprised of a right-angle receptacle connector 100 mounted on the circuit board 3 and a right-angle plug connector 200 mounted on the circuit board 4. The connectors 100, 200 may be referred to as "right-angle" connectors because mounting portions 5, 6 of their power terminals and signal terminals (discussed below) may be oriented generally perpendicular to their mating directions, which are represented in FIG. 1 by the dashed arrows above each of the connectors 100, 200. In some embodiments, the connector 100 may be configured such that a side surface or edge 7 is aligned with an edge 3A of the circuit board 3, and the connector 200 may be configured such that a side surface or edge 8 is aligned with an edge 4A of the circuit board 4. In some embodiments, the side surfaces 7, 8 may serve as portions of mating interfaces of the connectors 100, 200. With such board-to-board configurations, when the connectors 100, 200 are in a mated position, such as depicted in FIG. 1, the circuit board 3 of the connector 100 may be aligned parallel with the circuit board 4 of the connector 200 such that their edges 3A, 4A face each other and may even touch, in some embodiments. In some embodiments, such configurations may advantageously enable the connectors 100, 200 to be supported by the circuit boards 3, 4 at or very close their side surfaces 7, 8. The additional rigidity provided by the circuit boards 3, 4, at or near the side surfaces 7, 8 may enable, for example, electrical connections between the connectors 100, 200 to be robust even under conditions where the mated pair 1 may experience vibrations or shock, which may arise when the mated pair 1 is part of an electronic system that undergoes jostling and/or movement in ordinary use.

According to some embodiments, the mated pair 1 may be deployed in an electronic system intended to be portable. Portable systems typically are compact, for ease of handling and to minimize weight, and therefore may have little room for electrical connectors. In situations where a flat, narrow clearance space is available for electrical connections, the board-to-board configuration of the mated pair 1 may be particularly suitable. In some embodiments, a maximum height H1 of the connectors 100, 200 from a first surface 9A, 10A facing the circuit board 3, 4 to a second surface 9B, 10B opposite the first surface 9A, 10A may be in a range from 5.0 mm to 14.0 mm (e.g., from 6.0 mm to 12.0 mm, from 6.5 mm to 7.5 mm, from 10.5 mm to 11.5 mm, from 7.0 mm to 9.0 mm). In some embodiments, the height H1 may have a value of approximately 8.0 mm. Thus, the connectors 100, 200 may be considered to have a low profile.

Figure 2:
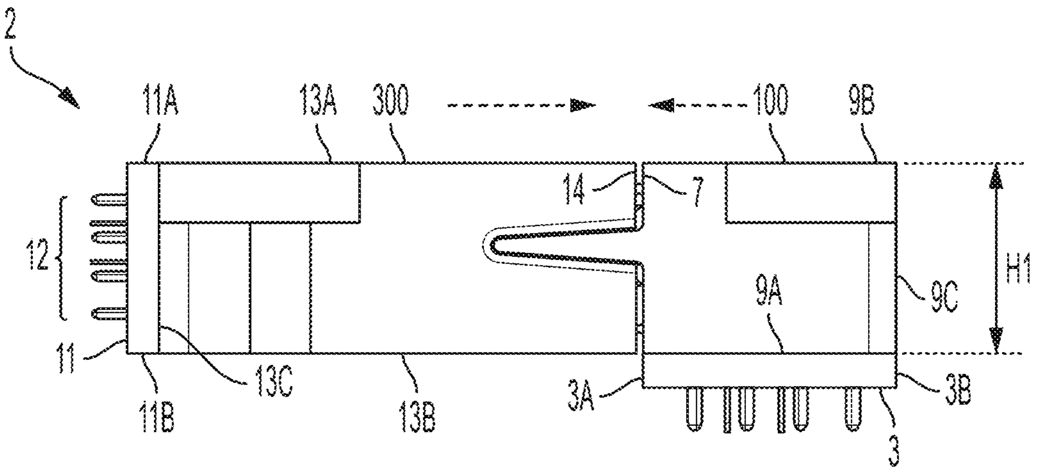
FIG. 2 is an elevational side view of the right-angle receptacle connector of FIG. 1 and an exemplary embodiment of a vertical plug connector in a mated position and mounted on respective circuit boards.

FIG. 2 shows a mated pair 2 of electrical connectors comprised of the receptacle connector 100 and a vertically oriented plug connector 300 mounted on respective circuit boards 3, 11. The connector 300 may be referred to as a "vertical" connector because a mounting portion 12 of its power terminals and signal terminals (discussed below) may be oriented generally parallel to its mating direction, which is represented in FIG. 2 by the dashed arrow above the connector 300. The connector 300 may be similar to the connector 200 except for the configurations of their power terminals and signal terminals. In some embodiments, the connector 300 may be configured such that a first side surface 13A is aligned with an edge 11A of the circuit board 11. In some embodiments, the first side surface 13A also may be aligned with the second surface 9B of the connector 100, as shown in FIG. 2. In some embodiments, the connector 300 may be configured such that a second side surface 13B is aligned with an edge 11B of the circuit board 11. In some embodiments, the second side surface 13B also may be aligned with the first surface 9A of the connector 100, as shown in FIG. 2.

In some embodiments, the connector 100 may be configured such that a third surface 9C may be aligned with an edge 3B of the circuit board 3, as shown in FIG. 2. In some embodiments, the second side surface 13B also may be aligned with the first surface 9A of the connector 100, as shown in FIG. 2. Similarly, although not specifically shown in the drawings, the connector 200 may be configured such that a third surface 10C is aligned with an edge of the circuit board 4 opposite to the edge 4A.

In some embodiments, a height of the connector 300 from the first side surface 13A to the second side surface 13B may be the height H1 of the connector 100.

According to some embodiments, the vertical-to-right-angle configuration of the mated pair 2 may enable the mated pair 2 to provide robust electrical connections in situations where a narrow clearance space is available at a corner of an electronic system.

Figure 3:
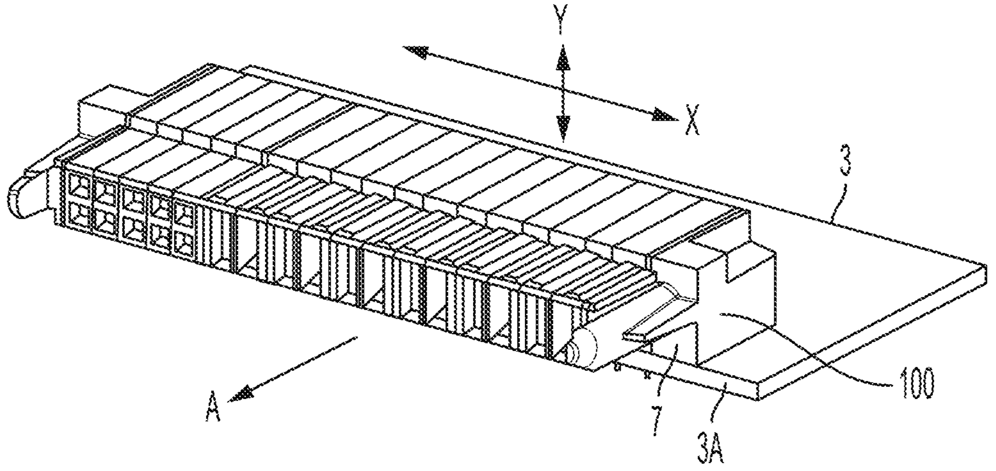
FIG. 3 is a perspective top front view of the receptacle connector of FIG. 1 mounted on the circuit board.

FIG. 3 shows a perspective view of the receptacle connector 100 mounted on the circuit board 3, according to some embodiments. The connector 100 may have a low profile relative to the circuit board 3 and may be oriented such that a plurality of power terminals (described below) are aligned in a row along a row or X direction. In some embodiments, the connector 100 may have a plurality of rows of power terminals, with the rows being aligned or stacked in a column or Y direction such that the power terminals may be arranged in an array of columns and rows. Similarly, the connector 100 may be comprised of a plurality of signal terminals (described below) arranged in a single row aligned with the X direction or in an array of rows and columns aligned with the X and Y directions.

For clarity of illustration, the connectors described herein may be illustrated as multiple segments, aligned side-by-side. Such an illustration reveals that a connector (e.g., the connector 100) may have multiple segments of a limited number of types. As noted above, a housing of the connector may be constructed by separately forming and then joining insulative housing portions for these segments or may be formed from one or more sections containing multiple such segments. For example, in some embodiments, a segmented connector may be constructed with a single or unitary insulative power housing structured to accommodate power terminals joined with a single or unitary insulative signal housing structured to accommodate signal terminals. In other embodiments, an entire housing of a connector may be unitarily formed, such as by molding plastic, nylon, or another insulative material.

Figure 4:
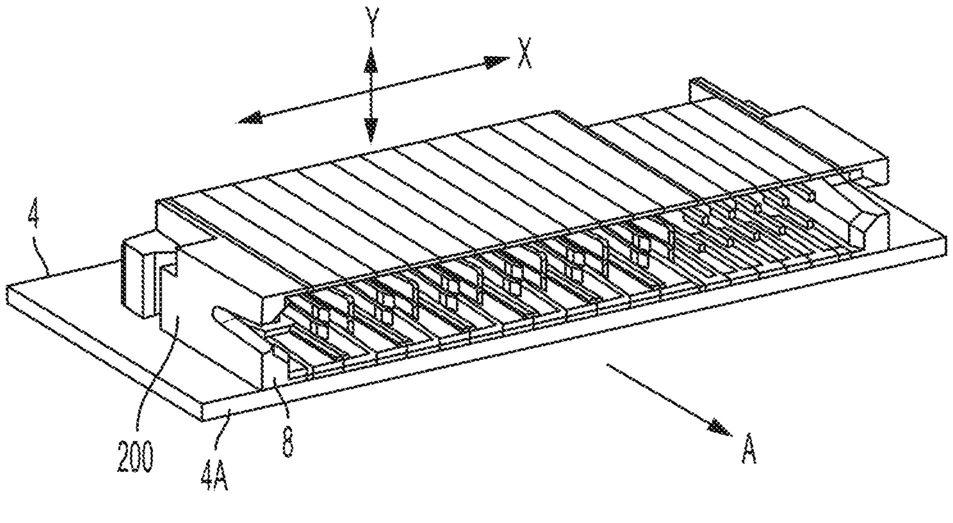
FIG. 4 is a perspective top front view of the plug connector of FIG. 1 mounted on the circuit board.

FIG. 4 shows a perspective view of the plug connector 200 mounted on the circuit board 4, according to some embodiments. The connector 200 may constructed with materials and techniques similar to those used for the connector 100, with components of the connector 200 being shaped complementarily to corresponding components of connector 100 so that the two connectors mate. The connector 200 may have a low profile relative to the circuit board 4 and may be oriented such that a plurality of power terminals (described below) are aligned in a single row along the X direction or in an array of columns and rows aligned with the X and Y directions. Similarly, the connector 200 may be comprised of a plurality of signal terminals (described below) arranged in a single row aligned with the X direction or in an array of columns and rows aligned with the X and Y directions. The power terminals of the connector 200 may be configured to engage with corresponding power terminals of the connector 100 to transmit power between the connectors 100, 200. Likewise, the signal terminals of the connector 200 may be configured to engage with corresponding signal terminals of the connector 100 to transmit signals between the connectors 100, 200.

In FIGS. 3 and 4, the arrow A represents the mating direction of the connectors 100, 200.

Right-Angle Receptacle Connector

Figure 5:
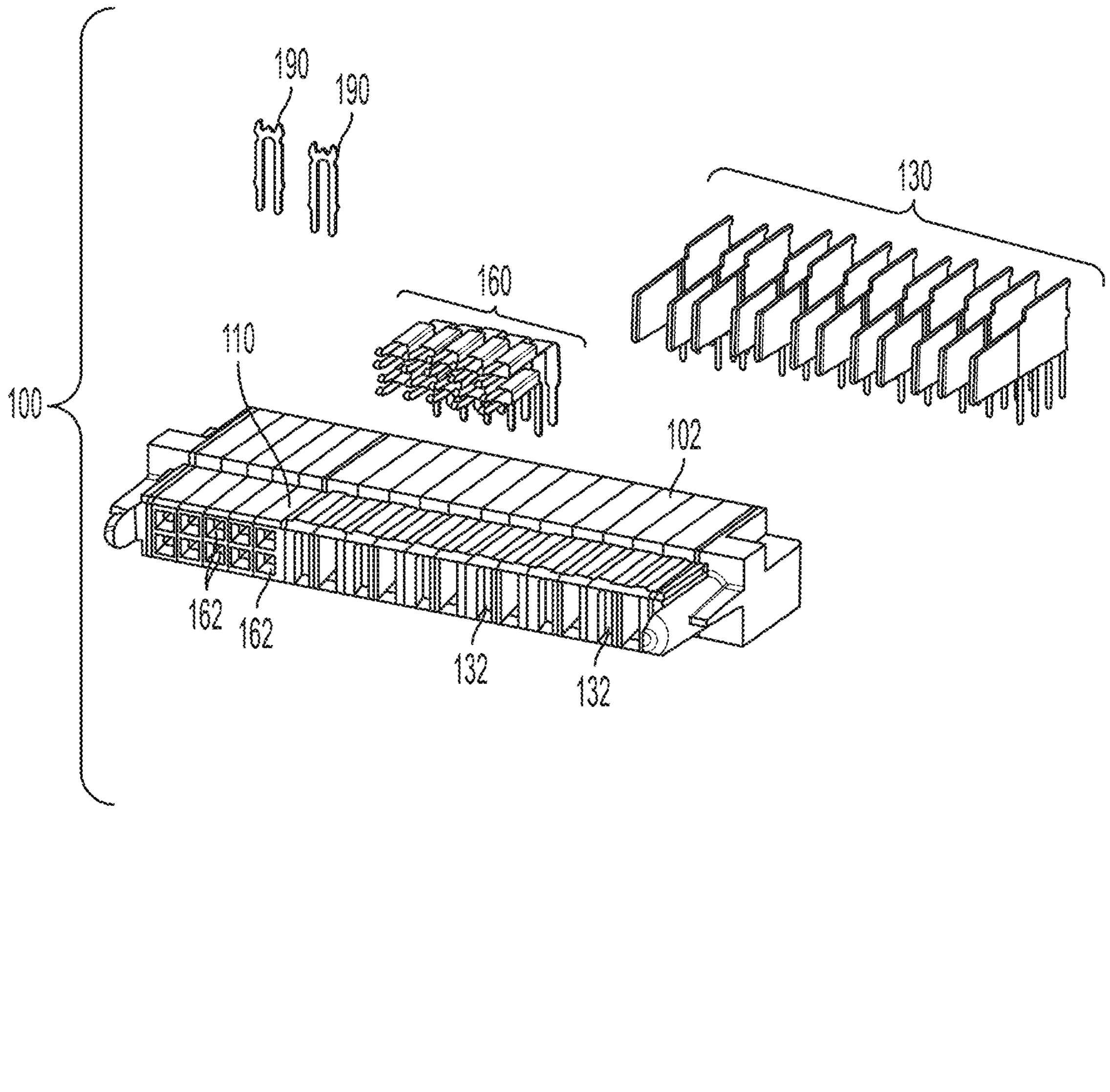
FIG. 5 is a perspective top front view of the receptacle connector of FIG. 1 in a partially disassembled state.

FIG. 5 shows the receptacle connector 100 in a partially disassembled state, according to some embodiments. FIGS. 6A through 6D show, respectively, a perspective top front view, an elevational side view, a perspective bottom front view, and an elevational front view of the receptacle connector 100, according to some embodiments. The connector 100 may be comprised of an insulative housing 102, a plurality of electrically conductive power terminals 130, a plurality of electrically conductive signal terminals 160, and at least two hold-down clips 190. Each of the terminals 130, 160 and the hold-down clips 190 may be disposed at least partially in the housing 102. Each of the terminals 130, 160 and the clips 190 may have a mounting portion configured to mount to the circuit board 3. In some embodiments, the circuit board 3 may be comprised of holes configured to receive the mounting portions of the terminals 130, 160 and the clips 190, which may be fixedly attached to the circuit board 3. The power terminals 130 and the signal terminals 160 may be formed of metal or another material having high electrical conductivity, and may be fixed to the circuit board by, e.g., soldering, although attachment techniques other than soldering may be used. The hold-down clips 190 may be formed of metal, which may enable soldering of the clips 190 to the circuit board 3, or the clips 190 may be formed of a hard plastic or another material having high stiffness and configured to engage in or latch to corresponding holes in the circuit board 3 through an interference fit other than soldering.

According to some embodiments, contact portions of the power terminals 130 and contact portions of the signal terminals 160 may be exposed through contact openings 132, 162 in an engagement protrusion 110 of the housing 102. The engagement protrusion 110 may be configured to be received in a corresponding engagement portion (e.g., an accommodation space) of a mating connector (e.g., the plug connector 200, 300) when the connector 100 and the mating connector are mated together. In some embodiments, the engagement protrusion 110 may be part of the mating interface of the connector 100 and may protrude from the side surface 7 of the connector 100, as depicted in FIG. 6B. In some embodiments, the contact portions of the power terminals 130 and the signal terminals 160 may extend in the mating direction A into the engagement protrusion 110, and mounting legs of the power terminals 130 and the signal terminals 160 may extend in the Y direction perpendicular to the mating direction A.

Figure 6A:
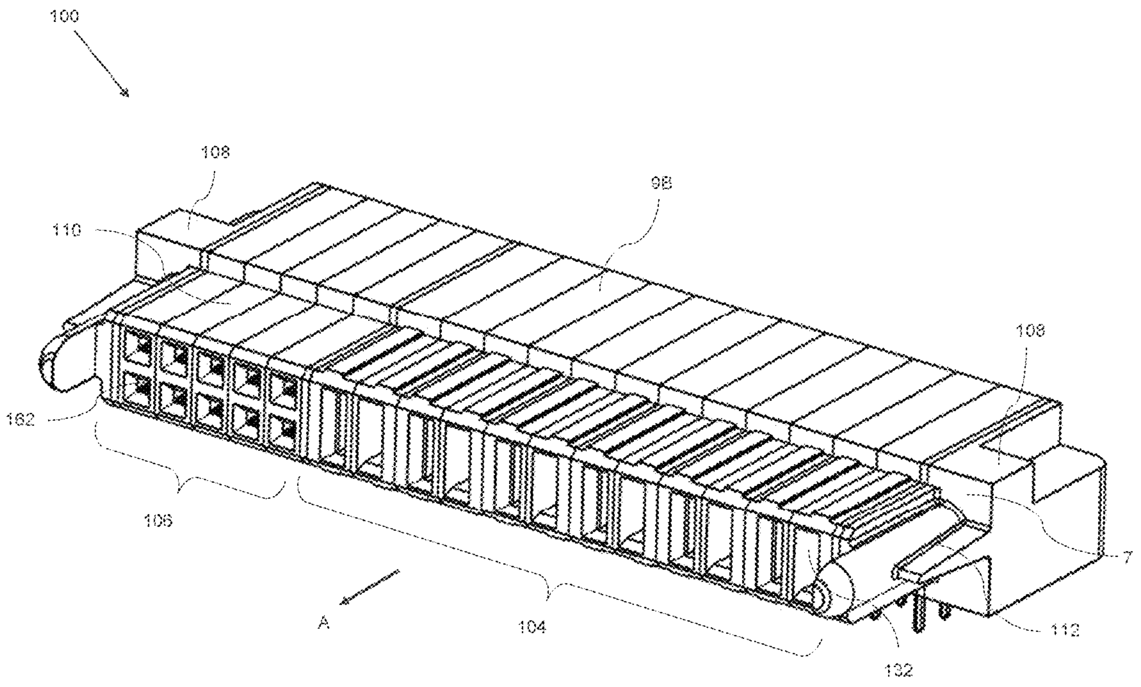
FIG. 6A is a perspective top front view of the receptacle connector of FIG. 1.
Figure 6B:
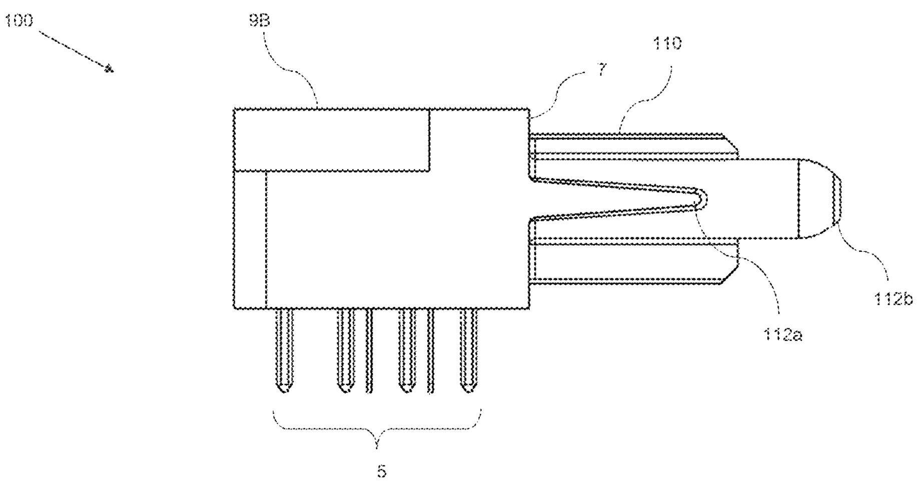
FIG. 6B is an elevational side view of the receptacle connector of FIG. 1.

According to some embodiments, the connector 100 may be comprised of a power portion 104 and a signal portion 106 sandwiched between two end portions 108, as shown in FIG. 6A. In some embodiments, a spacer portion may separate the power portion 104 from the signal portion 106. Each of the end portions 108 may be comprised of an alignment structure configured to facilitate proper alignment of the connector 100 with a mating connector (e.g., the connector 200, 300). In some embodiments, the alignment structure may be a multi-level protrusion 112 comprised of a first portion 112*a* that extends from the side surface 7 by a first distance and a second portion 112*b* that extends from the side surface 7 by a second distance greater than the first distance. In some embodiments, the first and second portions 112*a*, 112*b* may be shaped to facilitate seating of the first and second portions 112*a*, 112*b* in corresponding recesses in a mating connector. For example, each of the first and second portions may be comprised of any one or any combination of: a bevel, a curve, a slope, etc. In some embodiments, the first portions 112*a* may be the outermost portions of the housing 102 in the X direction. Although not depicted in FIGS. 6A through 6C, each of the end portions 108 may be attached to the circuit board 3 by at least one of the hold-down clips 190. In some embodiments, the clips 190 may have a U-shaped structure configured to clip the end portions 108 to the circuit board 3. The end portions 108 may be structured to have the same configuration with opposite orientations, such that they may be mirror images of each other.

Figure 6C:
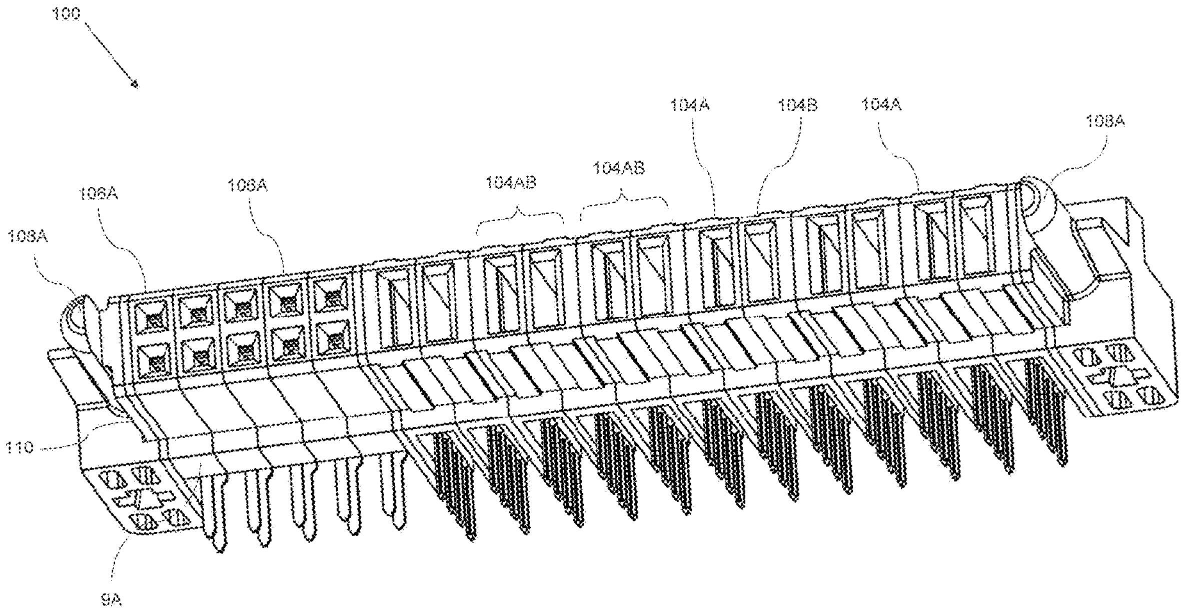
FIG. 6C is a perspective bottom front view of the receptacle connector of FIG. 1.

According to some embodiments, the connector 100 may have a segmented construction. That is, the connector 100 may be formed of segments joined together to form the housing 102, with the terminals 130, 160 and the hold-down clips 190 being disposed at least partially in the segments. In some embodiments, the power portion 104 may be comprised of a plurality of power segments 104A, 104B joined together, the signal portion 106 may be comprised of a plurality of signal segments 106A joined together, and each of the end portions 108 may be comprised of an end segment 108A. In some embodiments, the power segments 104A, 104B may alternate in the X direction and may be grouped as pairs 104AB, as depicted in FIGS. 6C and 6D.

Figure 6D:
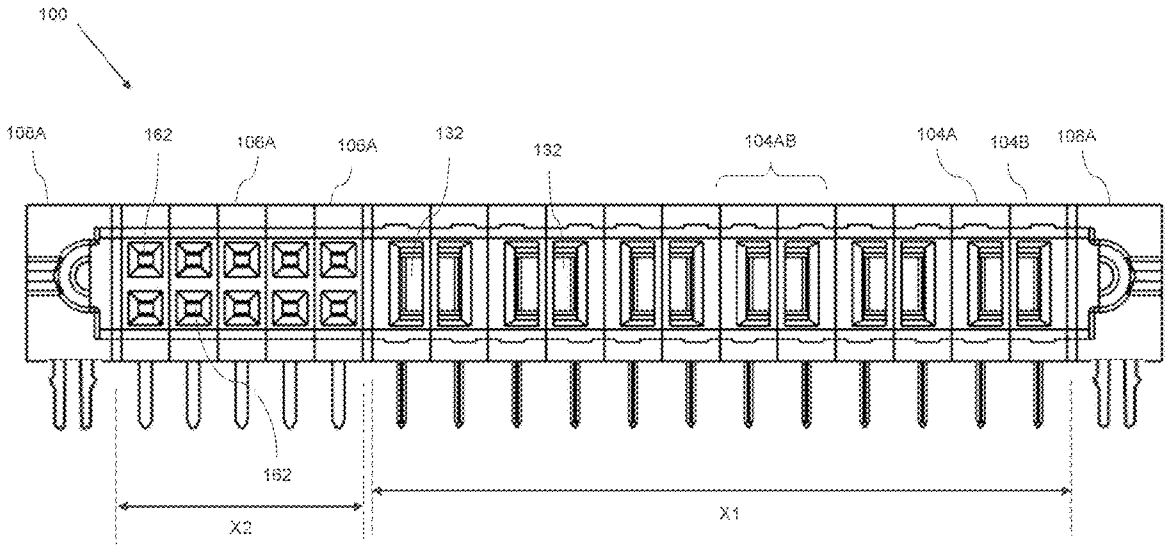
FIG. 6D is an elevational front view of the receptacle connector of FIG. 1.

According to some embodiments, the power portion 104 of the connector 100 may be comprised of twelve power terminals 130A, 130B spanning a distance X1, as depicted in FIG. 6D. In some embodiments, the distance X1 may be in a range from 30 mm to 40 mm (e.g., 32 mm to 38 mm). In some embodiments, the distance X1 may have a value of approximately 36 mm, with an average distance of 3 mm for each of the power terminals 130A, 130B. In some embodiments, the height H1 may have a value of approximately 8 mm. Thus, an area of a front face of the power portion (X1×H1) may be approximately 288 $mm^2$, in some embodiments. In some embodiments, a height of the engagement protrusion 110 may be in a range from 5 mm to 7 mm, and a typical value for this height may be approximately 6 mm. Therefore, an area of a front face of a power section of the engagement protrusion 110 may be approximately 216 $mm^2$, in some embodiments.

According to some embodiments, the signal portion 106 of the connector 100 may be comprised of ten signal terminals 160A, 160B spanning a distance X2, as depicted in FIG. 6D. In some embodiments, the distance X2 may be in a range from 10 mm to 15 mm (e.g., 11 mm to 14 mm). In some embodiments, the distance X2 may have a value of approximately 12.5 mm, with an average distance of 2.5 mm for each column of two power terminals 160A, 160B. Therefore, in some embodiments, an area of a front face of the signal portion (X2×H1) may be approximately 100 $mm^2$, and an area of a front face of a signal section of the engagement protrusion 110 may be approximately 75 $mm^2$.

FIG. 7A shows an elevational front view of the power segments 104A, 104B grouped as a pair 104AB, according to some embodiments, and FIG. 7B shows a perspective top front view of the pair 104AB. FIG. 7C shows a perspective bottom front view of the pair 104AB in a partially disassembled state. The power segments 104A, 104B may be aligned in the X direction and may be arranged in an alternating pattern. In some embodiments, each of the power segments 104A may be comprised of a conductive power terminal 130A attached to an insulative housing portion 102A. The power terminal 130A may be comprised of a body portion 130*a*, a contact portion 130*b*, and a mounting portion 130*c*. The mounting portion 130*c* may be comprised of one or more legs extending from the body portion 130*a* in the Y direction, and the contact portion 130*b* may be comprised of a power tab extending from the body portion 130*a* in the mating direction A perpendicular to the Y direction. As can be seen in FIGS. 7A through 7D, the contact portion (power tab) 130*b* may have a plate-like form. In some embodiments, the contact portions (power tabs) 130*b* of the power segments 104A may be vertically oriented such that their contact surfaces may be aligned with the Y direction.

The contact portion 130*b* may be disposed in an engagement portion 110A protruding from the side surface 7 such that the contact portion 130*b* may contact a corresponding contact portion of a mating connector via the contact hole 132 of the power segment 104A. The mounting portion 130*c* may comprise part of the mounting portion 5 of FIG. 1.

According to some embodiments, each of the power segments 104B may be comprised of a conductive power terminal 130B attached to an insulative housing portion 102B. The power terminal 130B may be comprised of a body portion 130*a*, a contact portion 130*b*, and a mounting portion 130*c*, similar to the power terminal 130A. In some embodiments, the power segment 104B may be the same as the power segment 104A. In some other embodiments, the power segment 104B may be a mirror image of the power segment 104A, as depicted in FIG. 7A. In such mirror-image embodiments, the power terminals 130A, 130B may be comprised of respective curved sections 130*d* that are mirror images of each other, as depicted in the perspective view of FIG. 7D.

FIG. 8A shows an elevational front view of the signal segment 106A, according to some embodiments, and FIG. 8B shows a perspective top front view of the signal segment 106A. FIG. 8C shows a perspective bottom front view of the signal segment 106A in a partially disassembled state. In some embodiments, the signal segment 106A may be comprised of first and second conductive signal terminals 160A, 160B attached to an insulative housing portion 102C. Each of the first and second signal terminals 160A, 160B may be comprised of a contact portion 160*b*, a mounting portion 160*c*, and a right-angle connector portion 160*d* connecting the contact portion 160*b* and the mounting portion 160*c*. The mounting portion 160*c* may be comprised of a leg extending from the connector portion 160*d* in the Y direction, and the contact portion 160*b* may be comprised of a contact clip extending from the connector portion 160*d* in the mating direction A perpendicular to the Y direction. The first and second signal terminals 160A, 160B may be arranged in the housing portion 102C such that their contact portions 160*b* are aligned or stacked in a column in the Y direction. The contact portions 160*b* of the first and second signal terminals 160A, 160B may be disposed in an engagement portion 110B of the housing portion 102C protruding from the side surface 7 such that the contact portions 160*b* may contact corresponding contact portions of a mating connector via the contact holes 162 of the signal segment 106A. The mounting portions 160*c* may comprise part of the mounting portion 5 of FIG. 1. In some embodiments, the connector portion 160*d* of the first signal terminal 160A may have a different structure from that of the connector portion 160*d* of the second signal terminal 160B. For example, the connector portion 160*d* of the first signal terminal 160A may have a longer total length compared to a total length of the connector portion 160*d* of the second signal terminal 160B, as shown in FIG. 8D. In another example, the connector portion 160*d* of the first signal terminal 160A may have a different edge contour from that of the connector portion 160*d* of the second signal terminal 160A, as shown in FIG. 8D. In a further example (not shown), the mounting portions 160*c* of the first and second signal terminals 160A, 160B may have a different appearance from each other.

According to some embodiments, each of the contact portions 160*b* of the first and second signal terminals 160A, 160B may be comprised of a contact clip having a pair of contact surfaces extending from the connector portion 160*d* via a pair of arms, as shown in FIG. 8D. The contact clip may resemble a pair of tweezers, in some embodiments, and may be configured to grasp or pinch a corresponding contact terminal (e.g., a contact pin) of a mating connector when the connector 100 and the mating connector are in a mated position.

FIGS. 9A and 9B show an elevational front view and a perspective top front view of one of the end segments 108A, according to some embodiments. As noted above, the end segments 108A may be located on opposite ends of the connector 100 sandwiching the power segments 104A, 104B and the signal segments 106A in between. As will be appreciated, the other one of the end segments 108A may be a mirror image of the one shown in FIG. 9A and therefore will not be described separately. In some embodiments, the end segment 108A may be comprised of an insulative housing portion 102D to which at least one of the hold-down clips 190 is attached. FIG. 9C shows a perspective bottom front view of the housing portion 102D. For example, a mounting portion 190*c* of the hold-down clip 190 may extend through a recess 102*d* of the housing portion 102D. In some embodiments, the hold-down clip 190 may be a retainer clip comprised of a plurality of legs (190*c*) extending from a bridge (190*a*), as depicted in FIG. 9D. In some embodiments, the hold-down clip 190 may be attached to the housing portion 102D such that the legs forming the mounting portion 190*c* extend from the housing portion 102D in the Y direction. The end segment 108A may have an alignment structure similar to that described above for the end portion 108, and therefore will not be described separately.

Right-Angle Plug Connector

Figure 10:
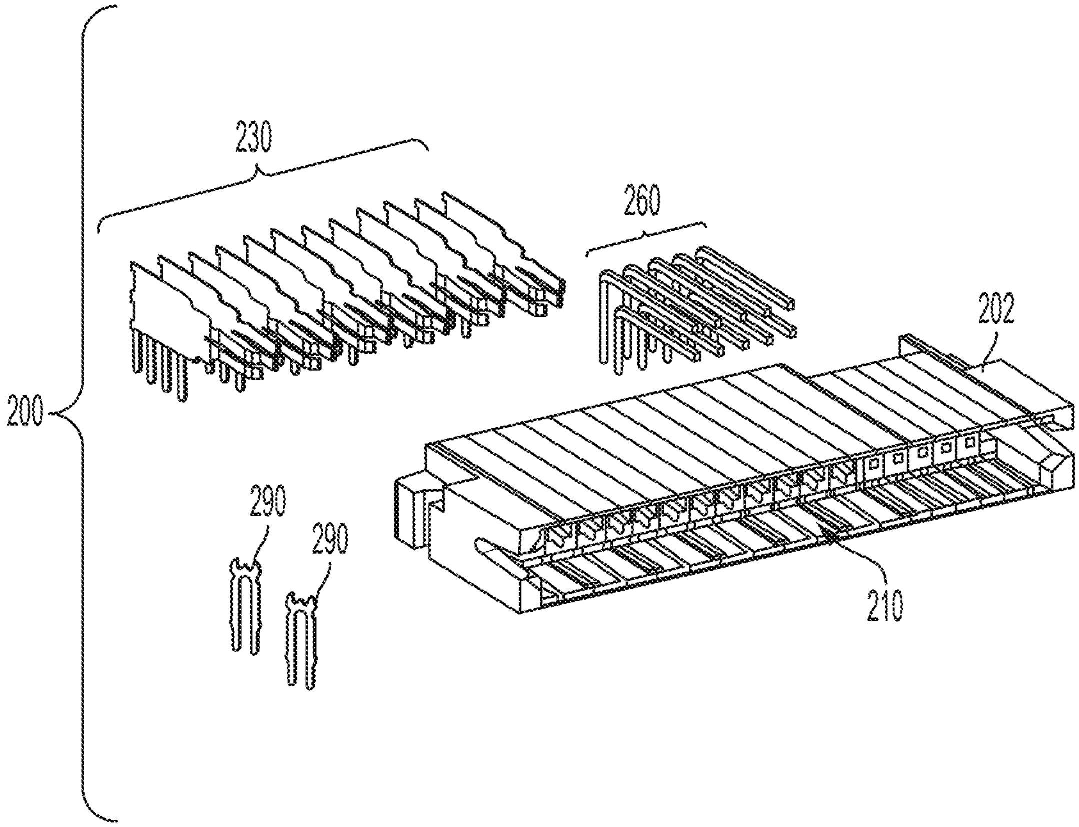
FIG. 10 is a perspective top front view of the plug connector of FIG. 1 in a partially disassembled state.

Turning now to the plug connector 200, FIG. 10 shows the connector 200 in a partially disassembled state, according to some embodiments. FIGS. 11A through 11D show, respectively, a perspective top front view, an elevational side view, a perspective bottom front view, and an elevational front view of the connector 200, according to some embodiments. The connector 200 may be comprised of an insulative housing 202, a plurality of electrically conductive power terminals 230, a plurality of electrically conductive signal terminals 260, and at least two hold-down clips 290. Each of the terminals 230, 260 and the hold-down clips 290 may be disposed at least partially in the housing 202. Each of the terminals 230, 260 and the clips 290 may have a mounting portion configured to mount to the circuit board 4. In some embodiments, the circuit board 4 may be comprised of holes configured to receive the mounting portions of the terminals 230, 260 and the clips 290, which may be fixedly attached to the circuit board 4. The power terminals 230 and the signal terminals 260 may be formed of metal or another material having high electrical conductivity, and may be fixed to the circuit board 4 by, e.g., soldering, although attachment techniques other than soldering may be used. The hold-down clips 290 may be formed of metal, which may enable soldering of the clips 290 to the circuit board 4, or the clips 290 may be formed of a hard plastic or another material having high stiffness and configured to engage in or latch to corresponding holes in the circuit board 4 through an interference fit other than soldering.

According to some embodiments, contact portions of the power terminals 230 and contact portions of the signal terminals 260 may be disposed in an engagement space 210 of the housing 202. The engagement space 210 may be an accommodation space configured to receive a corresponding engagement portion (e.g., an engagement protrusion) of a mating connector (e.g., the receptacle connector 100) when the connector 200 and the mating connector are mated together. In some embodiments, the engagement space 210, which may be part of the mating interface of the connector 200, may be a cavity in the housing 202 and may extend into the housing 202 from the side surface 8 of the connector 200, as depicted in FIG. 11B. In some embodiments, the contact portions of the power terminals 230 and the signal terminals 260 may extend in the mating direction A into the engagement space 210, and the mounting portions of the power terminals 230 and the signal terminals 260 may extend in the Y direction perpendicular to the mating direction A.

Figure 11A:
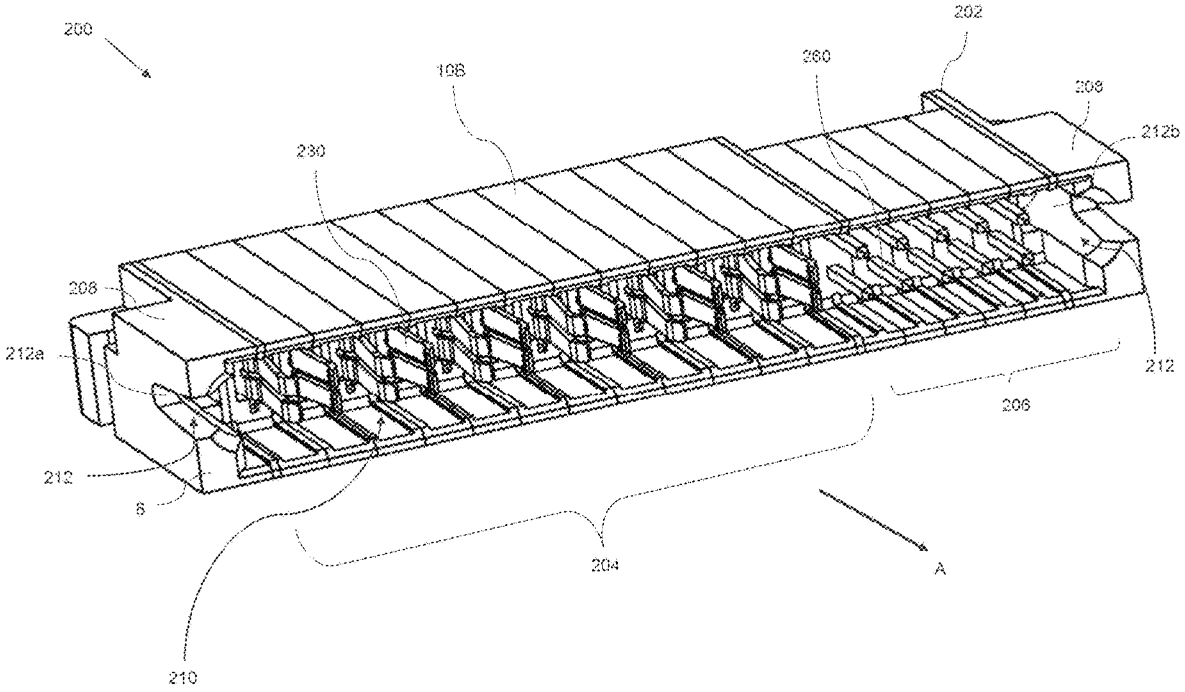
FIG. 11A is a perspective top front view of the plug connector of FIG. 1.
Figure 11B:
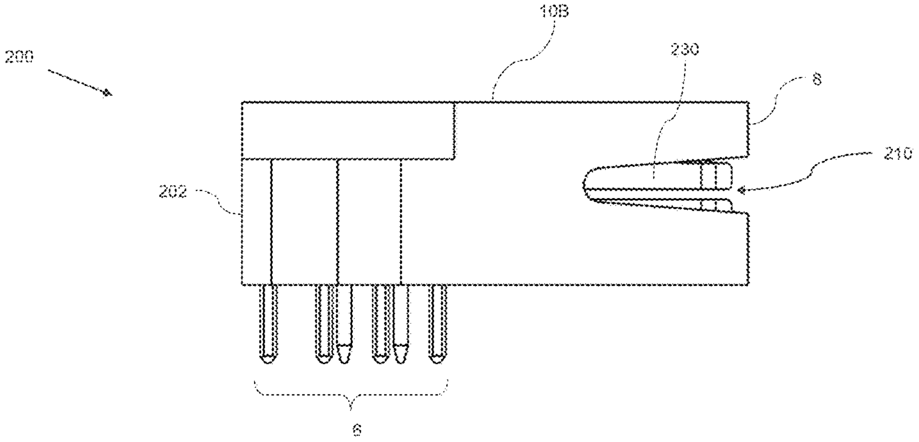
FIG. 11B is an elevational side view of the plug connector of FIG. 1.

According to some embodiments, the connector 200 may be comprised of a power portion 204 and a signal portion 206 sandwiched between two end portions 208, as shown in FIG. 11A. Each of the end portions 208 may be comprised of an alignment structure configured to facilitate proper alignment of the connector 200 with a mating connector (e.g., the connector 100). In some embodiments, the alignment structure may be a multi-level recess 212 comprised of a first portion that 212*a* that extends from the surface 8 into the housing 202 by a first distance and a second portion 212*b* that extends from the side surface 8 into the housing 202 by a second distance greater than the first distance. In some embodiments, the first and second portions 212*a*, 212*b* of the recess 212 may be shaped to facilitate seating of a corresponding multi-level mating protrusion of a mating connector. For example, each of the first and second portions 212*a*, 212*b* may be comprised of any one or any combination of: a bevel, a curve, a slope, etc.

Although not depicted in FIGS. 11A through 11C, each of the end portions 208 may be attached to the circuit board 4 by at least one of the hold-down clips 290. In some embodiments, the hold-down clips 290 may have a U-shaped structured configured to clip the end portions 208 to the circuit board 4.

According to some embodiments, the connector 200 may have a segmented construction. That is, the connector 200 may be formed of segments joined together to form the housing 202, with the terminals 230, 260 and the hold-down clips 290 being disposed at least partially in the housing 202. In some embodiments, the power portion 204 may be comprised of a plurality of power segments 204A, 204B joined together, the signal portion 206 may be comprised of a plurality of signal segments 206A joined together, and each of the end portions 208 may be comprised of an end segment 208A. In some embodiments, the power segments 204A, 204B may alternate in the X direction and may be grouped as pairs 204AB, as depicted in FIGS. 11C and 11D.

FIG. 12A shows an elevational front view of the power segments 204A, 204B grouped as a pair 204AB, according to some embodiments, and FIG. 12B shows a perspective top front view of the pair 204AB. FIG. 12C shows a perspective bottom front view of the pair 204AB in a partially disassembled state. The power segments 204A, 204B may be aligned in the X direction and may be arranged in an alternating pattern. In some embodiments, each of the power segments 204A may be comprised of a conductive power terminal 230A attached to an insulative housing portion 202A. The power terminal 230A may be comprised of a body portion 230*a*, a contact portion 230*b*, and a mounting portion 230*c*. The mounting portion 230*c* may be comprised of one or more legs extending from the body portion 230*a* in the Y direction, and the contact portion 230*b* may be comprised of fingers extending from the body portion 230*a* in the mating direction A perpendicular to the Y direction. The contact portion 230*b* may be disposed in an engagement space 210A extending into the housing portion 202A from the side surface 8 such that the contact portion 230*b* may contact a corresponding contact portion of a mating connector when the connector 200 and the mating connector are in a mated position. The mounting portion 230*c* may comprise part of the mounting portion 6 of FIG. 1. In some embodiments, each of the power segments 204B may be comprised of a conductive power terminal 230B attached to an insulative housing portion 202B. The power terminal 230B may be comprised of a body portion 230*a*, a contact portion 230*b*, and a mounting portion 230*c*, similar to the power terminal 230A, with the contact portion 230*b* being disposed in an engagement space 210B of the power terminal 230B. In some embodiments, the power segment 204B may be the same as the power segment 204A. In some embodiments, the power segments 204B and the power segments 204A may be mirror images of each other. In some embodiments, the power terminals 230A, 230B may have respective curved sections 230*d* that are mirror images of each other, as depicted in FIG. 12D.

FIG. 13A shows an elevational front view of the signal segment 206A, according to some embodiments, and FIG. 13B shows a perspective top front view of the signal segment 206A. FIG. 13C shows a perspective front view of the signal segment 206A in a partially disassembled state. In some embodiments, the signal segment 206A may be comprised of first and second conductive signal terminals 260A, 260B attached to an insulative housing portion 202C. Each of the first and second signal terminals 260A, 260B may be comprised of a contact portion 260*b*, a mounting portion 260*c*, and a right-angle connector portion 260*d* connecting the contact portion 260*b* and the mounting portion 260*c*. The mounting portion 260*c* may be comprised of a leg extending from the connector portion 260*d* in the Y direction, and the contact portion 260*b* may be comprised of a contact pin extending from the connector portion 260*d* in the mating direction A perpendicular to the Y direction. The first and second signal terminals 260A, 260B may be arranged in the housing portion 202C such that their contact portions 260*b* are aligned or stacked in a column in the Y direction. The contact portions 260*b* of the first and second signal terminals 260A, 260B may be disposed in an engagement space 210B of the housing portion 202C and may extend into the housing portion 202C from the side surface 8 such that the contact portions 260*b* may contact corresponding contact portions of a mating connector. The mounting portions 260*c* may comprise part of the mounting portions 6 of FIG. 1. In some embodiments, the connector portion 260*d* of the first signal terminal 260A may have a different structure from that of the connector portion 260*d* of the second signal terminal 260B. For example, the connector portion 260*d* of the first signal terminal 260A may have a longer total length compared to a total length of the connector portion 260*d* of the second signal terminal 260B, as shown in FIG. 13C.

FIG. 14A shows an elevational front view of one of the end segments 208A, according to some embodiments. As noted above, the end segments 208A may be located on opposite ends of the connector 200 sandwiching the power segments 204A, 204B and the signal segments 206A in between. As will be appreciated, the other one of the end segments 208A may be a mirror image of the one shown in FIG. 14A and therefore will not be described separately. In some embodiments, the end segment 208A may be comprised of an insulative housing portion 202D to which at least one of the hold-down clips 290 is attached. FIGS. 14B and 14C show, respectively, a perspective top front view and a perspective bottom front view of the housing portion 202D. For example, a mounting portion 290*c* of the hold-down clip 290 may extend through a recess 202*d* of the housing portion 202D. In some embodiments, the hold-down clip 290 may be a U-shaped retainer clip comprised of a plurality of legs (290*c*) extending from a bridge (290*a*), as depicted in FIG. 14D. In some embodiments, the hold-down clip 290 may be attached to the housing portion 202D such that the legs forming the mounting portion 290*c* extend from the housing portion 202D in the Y direction. The end segment 208A may have the same alignment structure as that described above for the end portion 208. That is, in some embodiments, the alignment structure of the end segment 208A may be comprised of the first and second portions 212*a*, 212*b* forming the multi-level recess 212, which may extend from the side surface 8 into the housing 202D. In some embodiments, a depth of the second portion 212*b* as measured from the side surface 8 may be greater than a depth of the first portion 212*a* from the side surface 8.

According to some embodiments, the engagement spaces 210A, 210B, 210C of the power segments 204A, 204B and the signal segments 206A may be contiguous with each other to form the accommodation space 210 of the housing 200, as shown in FIGS. 10 and 11C. In some embodiments, the accommodation space 210 may be comprised of the multilevel recesses 212 of the end segments 208A such that the engagement spaces 210A, 210B, 210C and the multi-level recesses 212 form a contiguous cavity in the housing 200.

Vertical Plug Connector

Figure 15:
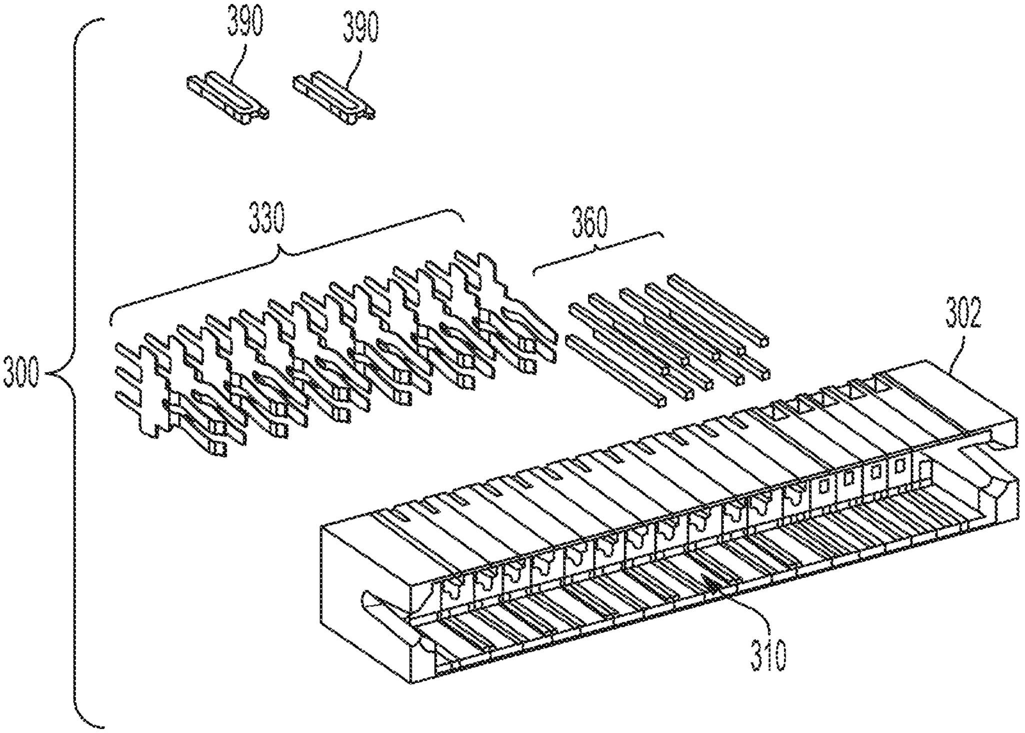
FIG. 15 is a perspective side view of the vertical plug connector of FIG. 2 in a partially disassembled state.

Turning now to the vertical plug connector 300, FIG. 15 shows the connector 300 in a partially disassembled state, according to some embodiments. FIGS. 16A through 16D show, respectively, a perspective top view, an elevational side view, a plan top view, and an elevational side view of the connector 300, according to some embodiments. The connector 300 may be comprised of an insulative housing 302, a plurality of electrically conductive power terminals 330, a plurality of electrically conductive signal terminals 360, and at least two hold-down clips 390. Each of the terminals 330, 360 and the hold-down clips 390 may be disposed at least partially in the housing 302.Each of the terminals 330, 360 and the clips 390 may have a mounting portion configured to mount to the circuit board 11. In some embodiments, the circuit board 11 may be comprised of holes configured to receive the mounting portions of the terminals 330, 360 and the clips 390, which may be fixedly attached to the circuit board 11. The power terminals 330 and the signal terminals 360 may be formed of metal or another material having high electrical conductivity, and may be fixed to the circuit board 11 by, e.g., soldering, although attachment techniques other than soldering may be used. The hold-down clips 390 may be formed of metal, which may enable soldering of the clips 390 to the circuit board 11, or the clips 390 may be formed of a hard plastic or another material having high stiffness and configured to engage in or latch to corresponding holes in the circuit board 11** through an interference fit other than soldering.

According to some embodiments, contact portions of the power terminals 330 and contact portions of the signal terminals 360 may be disposed in an engagement space 310 of the housing 302. The engagement space 310, which may be part of the mating interface of the connector 300, may be an accommodation space configured to receive a corresponding engagement portion (e.g., an engagement protrusion) of a mating connector (e.g., the receptacle connector 100) when the connector 300 and the mating connector are mated together. In some embodiments, the engagement space 310 may be a cavity in the housing 302 and may extend into the housing 302 from a side surface or edge 14 of the connector 300, as depicted in FIGS. 16A and 16B. The side surface 14 may be part of a mating interface of the connector 300. In some embodiments, the contact portions of the power terminals 330 and the signal terminals 360 may extend in the mating direction A into the engagement space 310, and the mounting portions 12 of the power terminals 330 and the signal terminals 360 may extend in a Z direction parallel to the mating direction A.

According to some embodiments, the connector 300 may be comprised of a power portion 304 and a signal portion 306 sandwiched between two end portions 308, as shown in FIG. 16A. Each of the end portions 308 may be comprised of an alignment structure configured to facilitate proper alignment of the connector 300 with a mating connector (e.g., the connector 100). In some embodiments, the alignment structure may be a multi-level recess similar to the multi-level recess 212 of the connector 200, discussed above, and therefore will not be described separately.

Figure 16C:
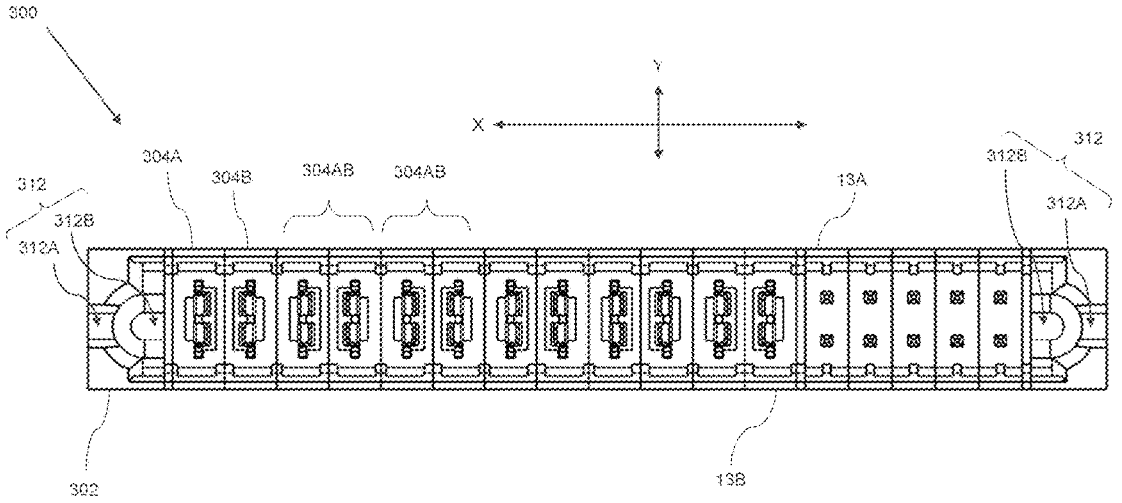
FIG. 16C is a plan top view of the plug connector of FIG. 2.
Figure 16D:
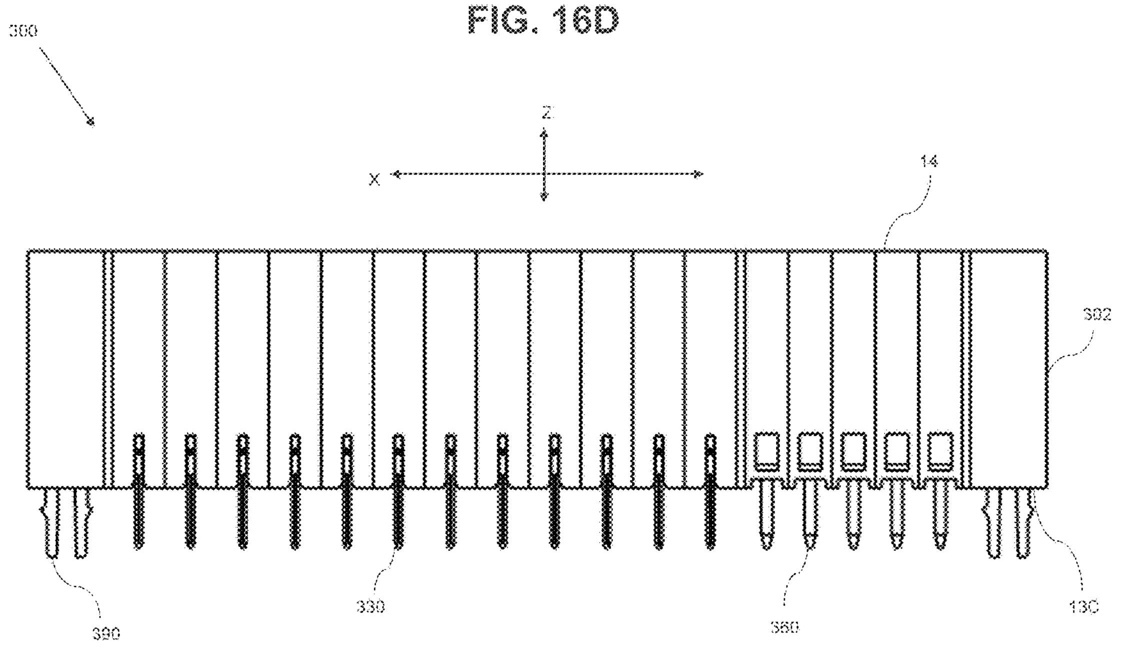
FIG. 16D is an elevational side view of the plug connector of FIG. 2.

According to some embodiments, the connector 300 may have a segmented construction and may be formed of segments joined together to form the housing 302 with the terminals 330, 360 and the hold-down clips 390 disposed at least partially therein. In some embodiments, the power portion 304 may be comprised of a plurality of power segments 304A, 304B joined together, the signal portion 306 may be comprised of a plurality of signal segments 306A joined together, and each of the end portions 308 may be comprised of an end segment 308A. In some embodiments, the power segments 304A, 304B may alternate in the X direction and may be grouped as pairs 304AB, as depicted in FIG. 16C. As shown in FIG. 16D, the terminals 330, 360, 390 generally extend in the Z direction parallel to the mating direction A.

FIG. 17A shows an elevational front view of the power segments 304A, 304B grouped as a pair 304AB, according to some embodiments, and FIG. 17B shows a perspective view of the pair 304AB. FIG. 17C shows a perspective view of the pair 304AB in a partially disassembled state. The power segments 304A, 304B may be aligned in the X direction and may be arranged in an alternating pattern. In some embodiments, each of the power segments 304A may be comprised of a conductive power terminal 330A attached to an insulative housing portion 302A. The power terminal 330A may be comprised of a body portion 330*a*, a contact portion 330*b*, and a mounting portion 330*c*. The mounting portion 330*c* may be comprised of one or more legs extending from the body portion 330*a* in the Z direction, which is parallel to the mating direction A, and the contact portion 330*b* may be comprised of fingers extending from the body portion 330*a* in the Z direction. The contact portion 330*b* may be disposed in an engagement space 310A extending into the housing portion 302A from the side surface 14 such that the contact portion 330*b* may contact a corresponding contact portion of a mating connector when the connector 300 and the mating connector are in a mated position. The mounting portion 330*c* may comprise part of the mounting portion 12 of FIG. 2. In some embodiments, each of the power segments 304B may be comprised of a conductive power terminal 330B attached to an insulative housing portion 302B. The power terminal 330B may be comprised of a body portion 330*a*, a contact portion 330*b*, and a mounting portion 330*c*, similar to the power terminal 330A. In some embodiments, the power segments 304B may be the same as the power segments 304A. In some other embodiments, the power segment 304B may be a mirror image of the power segment 304A. For example, as shown in the perspective view of FIG. 17D, the power terminals 330A, 330B may be comprised of respective curved sections 330*d* that are mirror images of each other.

FIG. 18A shows a plan top view of the signal segment 306A, according to some embodiments, and FIG. 18B shows a perspective top view of the signal segment 306A. FIG. 18C shows a perspective front view of the signal segment 306A in a partially disassembled state. In some embodiments, the signal segment 306A may be comprised of a plurality of conductive signal terminals 360A attached to an insulative housing portion 302C. Each of the signal terminals 360A may be comprised of a contact pin that may be generally straight and aligned in the Z direction parallel to the mating direction. The signal terminals 360A may be arranged in the housing portion 302C such that they are aligned or stacked in a column in the Y direction. The contact portions of the signal terminals 360A may be disposed in an engagement portion 310B of the housing portion 302C, which may be a recessed space that extends into the housing portion 302C from the side surface 14 such that the contact portions of the signal terminals 330A may contact corresponding contact portions of a mating connector.

FIG. 19A shows a plan top view of one of the end segments 308A, according to some embodiments. As noted above, the end segments 308A may be located on opposite ends of the connector 300 sandwiching the power segments 304A, 304B and the signal segments 306A in between. As will be appreciated, the other one of the end segments 308A may be a mirror image of the one shown in FIG. 19A and therefore will not be described separately. In some embodiments, the end segment 308A may be comprised of an insulative housing portion 302D to which at least one of the hold-down clips 390 is attached. FIG. 19B shows a perspective top view of an external side of the end segment 308A, and FIG. 19C shows a perspective top view of an internal side of the end segment 308A. In some embodiments, a mounting portion 390*c* of the hold-down clip 390 may extend in the Z direction through a recess (not shown) of the housing portion 302D. In some embodiments, the hold-down clip 390 may be a U-shaped retainer clip comprised of a plurality of legs (390*c*) extending from a bridge (390*a*). In some embodiments, the hold-down clip 390 may be attached to the housing portion 302D such that the legs forming the mounting portion 390*c* extend from the housing portion 302D in the Z direction. The end segment 308A may have the same alignment structure as that described above for the end portion 308. That is, in some embodiments, the alignment structure of the end segment 308A may be comprised of the first and second portions 312*a*, 312*b* forming the multi-level recess 312, which may extend from the side surface 14 into the housing 302D. In some embodiments, a depth of the second portion 312*b* as measured from the side surface 14 may be greater than a depth of the first portion 312*a* from the side surface 14.

According to some embodiments, the engagement spaces 310A, 310B, 310C of the power segments 304A, 304B and the signal segments 306A may be contiguous with each other to form the accommodation space 310 of the housing 300, as shown in FIGS. 15 and 16A. In some embodiments, the accommodation space 310 may be comprised of the multilevel recesses 312 of the end segments 308A such that the engagement spaces 310A, 310B, 310C and the multi-level recesses 312 form a contiguous cavity in the housing 300.

Stacked Receptacle Connector

In some miniature electronic systems there may be little space therein for wide electrical connectors. Therefore, it may be advantageous to be able to arrange the power terminals and the signal terminals in a densely or closely-packed configuration. According to some embodiments, a density of the power terminals in an electrical connector may be increased by arranging the power terminals in an array of rows and columns. That is, instead of a single row of power terminals aligned in the X direction, the connector may have at least two rows of power terminals stacked in the Y direction, such that each power terminal is part of a Y-direction column of at least one other power terminal.

Figure 20A:
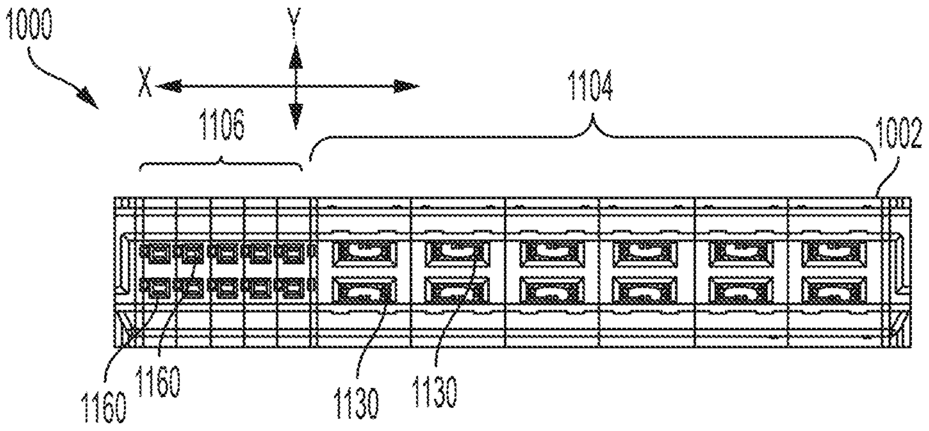
FIG. 20A is an elevational front view of an exemplary embodiment of a receptacle connector.

FIG. 20A shows an elevational front view of a stacked receptacle connector 1000, according to some embodiments, The connector 1000 may be a right-angle connector and may be similar in many ways to the connector 100 described above and therefore only stacking-related differences will be described. The connector 1000 may be comprised of an insulative housing 1102, a plurality of conductive power terminals 1130 and a plurality of conductive signal terminals 1160. The power terminals 1130 may be arranged in an array of rows and columns in a power portion 1104 of the connector 1000, and the signal terminals 1160 may be arranged in an array of rows and columns in a signal portion 1106 of the connector 1000. The signal portion 1104 may be similar to the signal portion 104 described above and therefore will not be described separately.

Figure 20B:
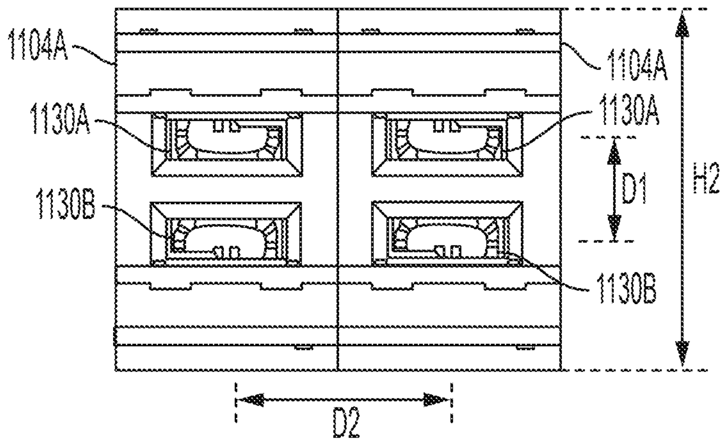
FIG. 20B is an elevational front view of an exemplary embodiment of two "stacked" power segments of the receptacle connector of FIG. 20A.

FIG. 20B shows an elevational front view of a section of the power portion 1104 comprised of four power terminals 1130A, 1130B arranged in two rows and two columns, according to some embodiments of the present invention. In some embodiments, the connector 1000 may have a segmented construction, similar to that of the connector 100 described above, with each power segment 1104A comprised of a column or stack of two power terminals 1130A, 1130B. A height H2 of the connector 1000 may be in a range from 9.0 mm to 13.0 mm (e.g., 10.0 mm to 12.0 mm). In some embodiments, a typical value for the height H2 may be approximately 11.0 mm.

According to some embodiments, each of the power terminals 1130A, 1130B may be comprised of a power tab oriented horizontally such that its contact surface is aligned with the X direction. In some embodiments, the power terminals 1130A, 1130B may be the same. In some other embodiments, the power terminals 1130A, 1130B may have power tabs that are mirror images of each other, as depicted in FIG. 20B. With such an arrangement, a distance D1 between center points of contact openings for the power terminals 1130A, 1130B in a column (i.e., in the Y direction) may be in a range from 1.5 mm to 4 mm (e.g., 1.5 mm to 2.5 mm). In some embodiments, a typical value for the distance D1 may be approximately 2.0 mm. In some embodiments, a distance D2 between center points of contact openings for the power terminals in adjacent columns and in the same row may be in a range from 6.0 mm to 8.0 mm (e.g., 6.5 mm to 7.5 mmm). In some embodiments, a typical value for the distance D2 may be approximately 7.0 mm. In some embodiments, the distance D2 also may be a width of the power segment 1104A in the X direction.

Figure 21:
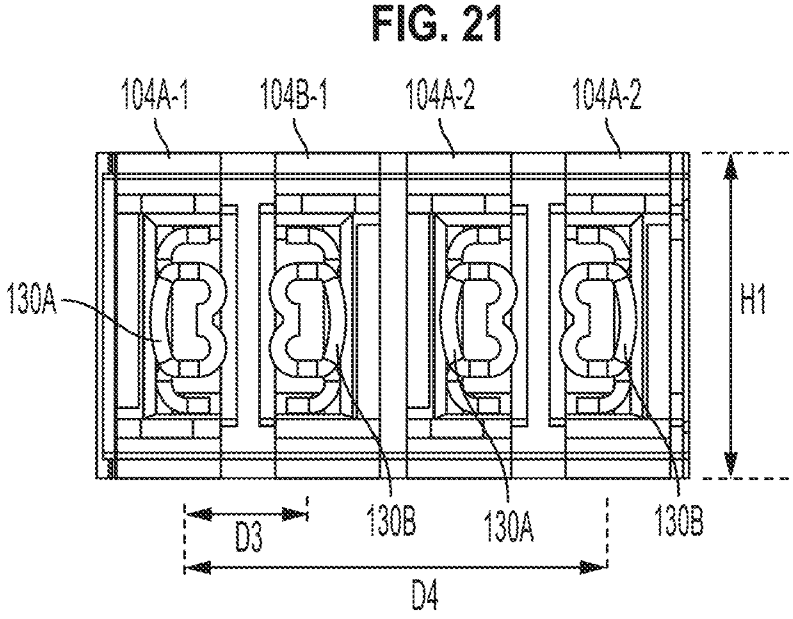
FIG. 21 is an elevational front view of an exemplary embodiment of four "in-line" power segments of a receptacle connector.

For the purpose of comparison, FIG. 21 shows an elevational front view of a section of the power portion 104 of the connector 100, comprised of four consecutive power segments 104A-1, 104B-1, 104A-2, 104B-2 arranged in a single row, according to some embodiments. In some embodiments, the power segments 104A-1, 104A-2 may correspond to the power segment 104A, and the power segments 104B-1, 104B-2 may correspond to the power segment 104B. As described above in connection with FIG. 7A, the height H1 of the connector 100 may be in a range from 5.0 mm to 14.0 mm. In some embodiments, a typical value for the height H1 may be approximately 8.0 mm. As depicted in FIG. 21, the power terminals 130A, 130B may be oriented vertically, i.e., with their contact surfaces (e.g., power tabs) aligned with the Y direction. With such an arrangement, a distance D3 between contact openings of adjacent power segments (e.g. the power segments 104A-1, 104B-1) may be in a range from 2.0 mm to 4.0 mm (e.g., 2.5 mm to 3.5 mmm). In some embodiments, a typical value for the distance D3 may be approximately 3.0 mm. In some embodiments, a distance D4 spanning from a center point of a contact opening of one power segment (e.g., the power segment 104A-1) and a center point of a contact opening of a fourth nearest power segment (e.g., 104A-2) may be in a range from 8.0 mm to 10.0 mm. In some embodiments, a typical value for the distance D4 may be approximately 9.0 mm.

According to some embodiments of the present invention, power terminals of a connector may be arranged relatively densely by stacking the power terminals in columns such that their power tabs are arranged horizontally in the columns. Such stacking may enable a separation distance of about 2 mm (corresponding to D1). In contrast, without stacking, there may be a greater separation distance of about 3 mm (corresponding to D3).

It should be understood that various alterations, modifications, and improvements may be made to the structures, configurations, and methods discussed above, and are intended to be within the spirit and scope of the invention disclosed herein. Further, although advantages of the present invention are indicated, it should be appreciated that not every embodiment of the invention will include every described advantage. Some embodiments may not implement any features described as advantageous herein. Accordingly, the foregoing description and attached drawings are by way of example only.

As one example, terminals are illustrated as having mounting legs for connection to a substrate such as a printed circuit board. In some embodiments, the legs may be suitable for through-hole soldering of the legs to holes in a circuit board. In other embodiments, the terminals may have tails for mounting to a circuit board, such as press-fit tails or surface-mount solder tails.

It should be understood that some aspects of the present technology may be embodied as one or more methods, and acts performed as part of a method of the present technology may be ordered in any suitable way. Accordingly, embodiments may be constructed in which acts are performed in an order different than shown and/or described, which may include performing some acts simultaneously, even though shown and/or described as sequential acts in various embodiments.

Various aspects disclosed herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the description and the claims to modify an element does not by itself connote any priority, precedence, or order of one element over another, or the temporal order in which acts of a method are performed, but are used merely as labels to distinguish one element or act having a certain name from another element or act having a same name (but for use of the ordinal term) to distinguish the elements or acts.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

As used herein in the specification and in the claims, the phrase "equal" or "the same" in reference to two values (e.g., distances, widths, etc.) means that two values are the same within manufacturing tolerances. Thus, two values being equal, or the same, may mean that the two values are different from one another by ±5%.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

Also, the phraseology and terminology used herein is for the purpose of description and should not be regarded as limiting. Use of terms such as "including," "comprising," "comprised of," "having," "containing," and "involving," and variations thereof herein, is meant to encompass the items listed thereafter and equivalents thereof as well as additional items.

The terms "approximately" and "about" if used herein may be construed to mean within ±20% of a target value in some embodiments, within ±10% of a target value in some embodiments, within ±5% of a target value in some embodiments, and within ±2% of a target value in some embodiments. The terms "approximately" and "about" may equal the target value.

The term "substantially" if used herein may be construed to mean within 95% of a target value in some embodiments, within 98% of a target value in some embodiments, within 99% of a target value in some embodiments, and within 99.5% of a target value in some embodiments. In some embodiments, the term "substantially" may equal 100% of the target value.

What is claimed is:

1. An electrical connector, comprising:

an insulative housing comprised of a mating interface configured to face a mating connector when the electrical connector and the mating connector are in a mated position;

a plurality of conductive power terminals attached to the housing and exposed at the mating interface; and a plurality of conductive signal terminals attached to the housing and exposed at the mating interface, wherein the housing is configured to be mounted on a circuit board such that a side surface of the housing is aligned with an edge of the circuit board, wherein:

for the power terminals:

each of the power terminals is comprised of a body portion, a mounting portion extending from the body portion, and a contact portion extending from the body portion, the mounting portions of the power terminals are configured to be attached to the circuit board, and the contact portions of the power terminals are configured to contact corresponding power terminals of the mating connector when the electrical connector and the mating connector are in the mated position, for the signal terminals:

each of the signal terminals is comprised of a mounting portion and a contact portion, the mounting portions of the signal terminals are configured to be attached to the circuit board, and the contact portions of the signal terminals are configured to contact corresponding signal terminals of the mating connector when the electrical connector and the mating connector are in the mated position, the mating interface of the housing is comprised of an engagement section, the engagement section of the mating interface is comprised of one or more contact openings through which the power terminals and the signal terminals are exposed, the contact portions of the signal terminals are disposed in the engagement section of the mating interface, the contact portions of the signal terminals are comprised of contact clips, each of the contact clips is configured to receive a corresponding signal-pin of the mating connector when the mating connector and the electrical connector are in the mated position, the signal terminals are arranged such that the contact clips of the signal terminals are disposed in the engagement section of the mating interface in columns and rows such that each of the columns is comprised of the contact clips of at least two of the signal terminals, and for each of the columns of the signal terminals, the mounting portions of the at least two of the signal terminals have lengths that are different from each other.

2. The electrical connector of claim 1, wherein:

the side surface of the housing is configured to be aligned with the edge of the circuit board such that, when the electrical connector and the mating connector are in the mated position, the circuit board is parallel with a corresponding circuit board on which the mating connector is mounted such that the edge of the circuit board faces an edge of the corresponding circuit board, the housing is configured to be mounted on the circuit board such that a bottom surface of the housing faces a surface of the circuit board and a top surface of the housing faces away from the surface of the circuit board, the side surface of the housing is perpendicular to the bottom surface of the housing, and a height of the housing, extending perpendicularly from the bottom surface of the housing to the top surface of the housing, is in a range from 5.0 mm to 14.0 mm.

3. The electrical connector of claim 2, wherein:

the contact portions of the power terminals are aligned in a row direction parallel to the bottom surface of the housing, and the height of the housing is in a range from 6.5 mm to 8.5 mm.

4. The electrical connector of claim 2, wherein:

the contact portions of the power terminals are arranged in an array comprised of a plurality of columns aligned perpendicular to the bottom surface of the housing and a plurality of rows aligned parallel to the bottom surface of the housing, and the height of the housing is in a range from 10.0 mm to 12.0 mm.

5. The electrical connector of claim 4, wherein:

each of the columns of the array is comprised of a pair of first and second power terminals of the power terminals, the first power terminals of the array are aligned in a first row, and the second power terminals of the array are aligned in a second row.

6. The electrical connector of claim 2, wherein the contact portions of the signal terminals are arranged in an array comprised of a plurality of columns aligned perpendicular to the bottom surface of the housing and a plurality of rows aligned parallel to the bottom surface of the housing.

7. The electrical connector of claim 1, wherein:

the contact portions of the power terminals are disposed in the engagement section of the mating interface, the contact portions of the power terminals are comprised of power tabs, for each of the power terminals, the power tab and the mounting portion extend from the body portion in perpendicular directions, the power terminals are arranged such that the power tabs of the power terminals are disposed in the engagement section of the mating interface in columns and rows such that each column is comprised of a pair of first and second power terminals of the power terminals.

8. The electrical connector of claim 1, wherein:

the housing has a segmented construction such that the housing is comprised of:

a plurality of first housing portions aligned in a row direction, with each of the first housing portions being configured to support at least one of the power terminals, a plurality of second housing portions aligned in the row direction, with each of the second housing portions being configured to support a group of the signal terminals, and first and second end housing portions located on opposite ends and sandwiching the first and second housing portions therebetween, and each of the first housing portions is configured to support at least two of the power terminals aligned in a column direction.

9. The electrical connector of claim 1, wherein:

for the power terminals, the mounting portion extends in a first direction from the body portion, and the contact portion extends in a second direction from the body portion, the second direction being perpendicular to the first direction, and for the signal terminals, the mounting portion extends in the first direction and the contact portion extends in the second direction.

10. The electrical connector of claim 9, wherein:

the engagement section comprises a protruding engagement section that extends beyond the side surface of the housing, and the one or more contact openings of the engagement section comprises a plurality of first contact openings through which the power terminals are exposed and a plurality of second contact openings through which the signal terminals are exposed.

11. The electrical connector of claim 10, wherein:

the electrical connector comprises a receptacle connector.

12. An electrical connector, comprising:

an insulative housing comprised of a mating interface configured to face a mating connector when the electrical connector and the mating connector are in a mated position;

a plurality of conductive power terminals attached to the housing and exposed at the mating interface; and a plurality of conductive signal terminals attached to the housing and exposed at the mating interface, wherein the housing is configured to be mounted on a circuit board such that a side surface of the housing is aligned with an edge of the circuit board, wherein:

the electrical connector is a plug connector, each of the power terminals is comprised of: a body portion, a mounting portion extending in a first direction from the body portion and configured to be attached to the circuit board when the housing is mounted on the circuit board, and a contact portion extending in a second direction from the body portion and configured to contact a corresponding power terminal of the mating connector when the electrical connector and the mating connector are in the mated position, the second direction being opposite to the first direction, each of the signal terminals is comprised of: a mounting portion extending in the first direction and configured to be attached to the circuit board when the housing is mounted on the circuit board, and a contact portion extending in the second direction and configured to contact a corresponding signal terminal of the mating connector when the electrical connector and the mating connector are in the mated position, the mating interface of the housing is comprised of an accommodation space configured to receive a protruding engagement section of the mating connector when the electrical connector and the mating connector are in the mated position, when the housing is mounted on the circuit board, a mating direction of the electrical connector with the mating connector is perpendicular to a surface of the circuit board, and the contact portions of the power terminals and the contact portions of the signal terminals are disposed in the accommodation space.

13. The electrical connector of claim 12, wherein:

the side surface of the housing is an outermost surface of the housing and is configured to be aligned with the edge of the circuit board such that no part of the housing extends beyond the edge of the circuit board when the housing is mounted on the circuit board, the mating interface of the housing is comprised of an accommodation space configured to receive a protruding engagement section of the mating connector when the electrical connector and the mating connector are in the mated position, when the housing is mounted on the circuit board, a mating direction of the electrical connector with the mating connector is perpendicular to a surface of the circuit board, and the contact portions of the power terminals and the contact portions of the signal terminals are disposed in the accommodation space.

14. The electrical connector of claim 13, wherein:

for each of the power terminals, the contact portion is comprised of a set of fingers extending from the body portion in the first direction, the fingers being configured to press against a corresponding power tab of the mating connector when the mating connector and the electrical connector are in the mated position, for each of the power terminals, the fingers and the mounting portion extend from the body portion in opposite directions, the power terminals are arranged such that the sets of fingers of the power terminals are disposed in the accommodation space of the mating interface in columns and rows such that each column is comprised of a pair of first and second power terminals of the power terminals.

15. The electrical connector of claim 13, wherein:

the contact portions of the signal terminals are comprised of contact pins, and each of the contact pins is configured to be inserted in a corresponding signal clip of the mating connector when the mating connector and the electrical connector are in the mated position.

16. The electrical connector of claim 12, wherein:

when the housing is mounted on the circuit board, the side surface of the housing faces a surface of the circuit board, a mating surface of the housing faces away from the surface of the circuit board, and top and bottom surfaces of the housing are perpendicular to the circuit board, a height of the housing, extending perpendicularly from the bottom surface of the housing to the top surface of the housing, is in a range from 5.0 mm to 14.0 mm, and for each of the power terminals, the contact portion is comprised of a set of fingers extending from the body portion in the first direction, the fingers being configured to press against a corresponding power tab of the mating connector when the mating connector and the electrical connector are in the mated position.

17. An electrical connector, comprising:

a plurality of power segments aligned in a row direction, each of the power segments being comprised of at least one conductive power terminal attached to a first insulative housing portion, each of the power terminals being configured to be attached to a circuit board;

a plurality of signal segments aligned in the row direction, each of the signal segments being comprised of a plurality of conductive signal terminals attached to a second insulative housing portion, each of the signal terminals being configured to be attached to the circuit board;

a first end segment comprised of a first insulative end portion and a first retainer clip attached to the first insulative end portion, the first retainer clip being configured to be attached to the circuit board, and a second end segment comprised of a second insulative end portion and a second retainer clip attached to the second insulative end portion, the second retainer clip being configured to be attached to the circuit board, wherein:

the power segments and the signal segments are disposed between the first and second end segments, each of the first and second end segments is comprised of a mating structure configured to engage with a corresponding mating structure of a mating connector when the electrical connector and the mating connector are in a mated position, the power segments and the signal segments are sandwiched between the first and second end segments, the first and second housing portions and the first and second end portions are attached to each other to form a housing comprised of a mating interface configured to engage with a mating interface of the mating connector when the electrical connector and the mating connector are in the mated position, and a side surface of the housing is aligned with an edge of the circuit board when the first and second end segments are attached to the circuit board by the first and second retainer clips.

18. The electrical connector of claim 17, wherein:

a height of the housing is in a range from 6.5 mm to 8.5 mm, the power segments are comprised of pairs of first and second power segments, with each of the first power segments being comprised of a first power terminal of the power terminals, and with each of the second power segments being comprised of a second power terminal of the power terminals, and the pairs of first and second power segments are aligned such that the first and second power segments are arranged in an alternating order in the row direction.

19. The electrical connector of claim 17, wherein:

each of the power segments is comprised of a pair of the power terminals, the pairs of the power terminals are arranged in an array comprised of a plurality of columns aligned perpendicular to a bottom surface of the housing and a plurality of rows aligned parallel to the bottom surface of the housing, and a height of the housing is in a range from 10.0 mm to 12.0 mm.

20. The electrical connector of claim 17, wherein:

the electrical connector is a plug connector, each of the power terminals is comprised of: a body portion, a mounting portion extending in a first direction from the body portion and configured to be attached to the circuit board, and a contact portion extending in a second direction from the body portion and configured to contact a corresponding power terminal of the mating connector when the electrical connector and the mating connector are in the mated position, the second direction being opposite to the first direction, each of the signal terminals is comprised of: a mounting portion extending in the first direction and configured to be attached to the circuit board, and a contact portion extending in the second direction and configured to contact a corresponding signal terminal of the mating connector when the electrical connector and the mating connector are in the mated position, the mating interface of the housing is comprised of an accommodation space configured to receive a protruding engagement section of the mating connector when the electrical connector and the mating connector are in the mated position, when the first and second end segments are attached to the circuit board, a mating direction of the electrical connector with the mating connector is perpendicular to a surface of the circuit board, and the contact portions of the power terminals and the contact portions of the signal terminals are disposed in the accommodation space.

* * * * *